US012223703B2

(12) United States Patent
Roy et al.

(10) Patent No.: US 12,223,703 B2
(45) Date of Patent: Feb. 11, 2025

(54) CLASSIFYING HANDWRITTEN MATH AND TEXT SYMBOLS USING SPATIAL SYNTACTIC RULES, SEMANTEC CONNECTIONS, AND INK-RELATED INFORMATION OF STROKES FORMING THE SYMBOLS

(71) Applicant: MyScript, Nantex (FR)

(72) Inventors: Udit Roy, Nantes (FR); Pierre-Michel Lallican, Nantes (FR); Robin Melinand, Nantes (FR)

(73) Assignee: MyScript, Nantes (FR)

( * ) Notice: Subject to any disclaimer, the term of this patent is extended or adjusted under 35 U.S.C. 154(b) by 289 days.

(21) Appl. No.: 17/795,503

(22) PCT Filed: Jan. 27, 2021

(86) PCT No.: PCT/EP2021/051838
§ 371 (c)(1),
(2) Date: Jul. 26, 2022

(87) PCT Pub. No.: WO2021/151929
PCT Pub. Date: Aug. 5, 2021

(65) Prior Publication Data
US 2023/0084641 A1    Mar. 16, 2023

(30) Foreign Application Priority Data
Jan. 28, 2020 (EP) ..................................... 20305069

(51) Int. Cl.
*G06V 30/262* (2022.01)
*G06V 10/82* (2022.01)
(Continued)

(52) U.S. Cl.
CPC ............ *G06V 10/82* (2022.01); *G06V 30/244* (2022.01); *G06V 30/274* (2022.01); *G06V 30/373* (2022.01)

(58) Field of Classification Search
CPC ... G06V 30/244; G06V 30/274; G06V 30/373
See application file for complete search history.

(56) References Cited

U.S. PATENT DOCUMENTS 7,561,737 B2 * 7/2009 Zou .................... G06V 30/1423
382/181
7,561,738 B2 * 7/2009 Zou .................... G06V 30/1423
382/181
(Continued)

OTHER PUBLICATIONS

Awal et al, "Improving Online Handwritten Mathematical Expressions Recognition with Contextual Modeling". 2010 12th International Conference on Frontiers in Handwriting Recognition, Kolkata, India, 2010, pp. 427-432 (Year: 2010).*
(Continued)

*Primary Examiner* — Scott A Rogers
(74) *Attorney, Agent, or Firm* — McDermott Will & Emery LLP

(57) ABSTRACT

The invention relates to a method implemented by a computing device for processing math and text in handwriting, comprising: identifying symbols by performing handwriting recognition on a plurality of strokes; classifying, as a first classification, first symbols as either a text symbol candidate or a math symbol candidate with a confidence score reaching a first threshold; classifying, as a second classification, second symbols other than first symbols as either a text symbol candidate or a math symbol candidate with a respective confidence score by applying predefined spatial syntactic rules; updating or confirming, as a third classification, a result of the second classification by establishing semantic connections between symbols and comparing the semantic
(Continued)

connections with the result of the second classification; and recognising each symbol as either text or math based on a result of said third classification.

14 Claims, 9 Drawing Sheets

(51) Int. Cl.
*G06V 30/244* (2022.01)
*G06V 30/32* (2022.01)

(56) References Cited

U.S. PATENT DOCUMENTS

| | | | | |
|---|---|---|---|---|
| 7,561,739 | B2* | 7/2009 | Xu | G06V 30/1423 |
| | | | | 382/181 |
| 7,729,538 | B2* | 6/2010 | Shilman | G06V 30/18029 |
| | | | | 382/187 |
| 8,818,033 | B1* | 8/2014 | Liu | G06V 30/414 |
| | | | | 382/103 |
| 9,858,506 | B2* | 1/2018 | Isupov | G06V 30/274 |
| 9,904,847 | B2* | 2/2018 | Onis | G06V 30/347 |
| 10,482,162 | B2* | 11/2019 | Cai | G06V 30/244 |
| 2006/0062470 | A1* | 3/2006 | Zhu | G06V 30/1423 |
| | | | | 382/186 |
| 2021/0089801 | A1* | 3/2021 | Durandet | G06F 40/171 |

OTHER PUBLICATIONS

Garain et al, "Recognition of online handwritten mathematical expressions". IEEE Transactions on Systems, Man, and Cybernetics, Part B (Cybernetics) 34.6 (2004): 2366-2376 (Year: 2004).*
Hu et al, "Segmenting Handwritten Math Symbols Using AdaBoost and Multi-scale Shape Context Features". 2013 12th International Conference on Document Analysis and Recognition, Washington, DC, USA, 2013, pp. 1180-1184 (Year: 2013).*
Sakshi, "A retrospective study on handwritten mathematical symbols and expressions: Classification and recognition". Engineering Applications of Artificial Intelligence 103 (2021): 104292. (Year: 2021).*
Xie, "On the recognition of handwritten mathematical symbols". Diss. Faculty of Graduate Studies, University of Western Ontario, 2007. (Year: 2007).*
Zanibbi et al, "Stroke-based performance metrics for handwritten mathematical expressions". 2011 International Conference on Document Analysis and Recognition. IEEE, 2011. (Year: 2011).*
RO/EP: International Search Report mailed on Apr. 22, 2021 for corresponding International Application No. PCT/EP2021/051838; 3 pgs.
RO/EP: Written Opinion mailed on Apr. 22, 2021 for corresponding International Application No. PCT/EP2021/051838; 7 pgs.
Gao, Liangcai, et al., "A Deep Learning-Based Formula Detection Method for PDF Documents," 2017 14th IAPR International Conference on Document Analysis and Recognition (ICDAR), IEEE, vol. 1, Nov. 9, 2017, pp. 553-558.
Zhang, Ting, et al., "A Tree-BLSTM-Based Recognition System for Online Handwritten Mathematical Expressions", Oct. 19, 2018 (Oct. 19, 2018), vol. 32, No. 9, p. 4689-4708.
Dai Nguyen, Hai, et al., "Deep Neural Networks for Recognizing Online Handwritten Mathematical Symbols", 2015 3rd IAPR Asian Conference on Pattern Recognition (ACPR), IEEE,Nov. 3, 2015 (Nov. 3, 2015), p. 121-125.
Jianshu, Zhang, et al., "A GRU-based Encoder-Decoder Approach with Attention for Online Handwritten Mathematical Expression Recognition", arxiv.org, Cornell University Library, 201 Olin Library Cornell University Ithaca, NY 14853,Dec. 4, 2017 (Dec. 4, 2017).

* cited by examiner

IN↘

SB1 let p be the point $(\frac{1}{2}, \frac{1}{2}) \in \mathbb{R}^2$, and let $L(c)$

FIG.7 additione +,
Sottrazione −,    SB1
moltiplicazione ×,
divisione ÷,

Thus any ring on $\Omega$ is also a semi-ring.
    SB1
Let $\alpha, \beta$ be such that

FIG.8

IN↘      SB2  SB1  SB2 let p be the point $(\frac{1}{2}, \frac{1}{2}) \in \mathbb{R}^2$, and let $L(c)$
                        SB2

FIG.9

FIG.10 class $C^1$ consists of all differentiable functions whose derivative is continuous; such function are called continuously differentiable. Thus, a $C^1$ function is exactly a function whose derivative exists and is of class $C^0$. In general, the classes $C^k$ can be defined recursively by declaring $C^0$ to be the set of all continuous functions and declaring $C^k$ for any

FIG.11 let p be the point $(\frac{1}{2},\frac{1}{2}) \in R^2$, and let $L(c)$

FIG.12A

Si n est un entier naturel, l'ensemble $n \cup \{n\}$

FIG.12B $P(E)$ n'est jamais vide car l'ensemble vide $\emptyset$ et $E$

FIG.12C
FIG.13
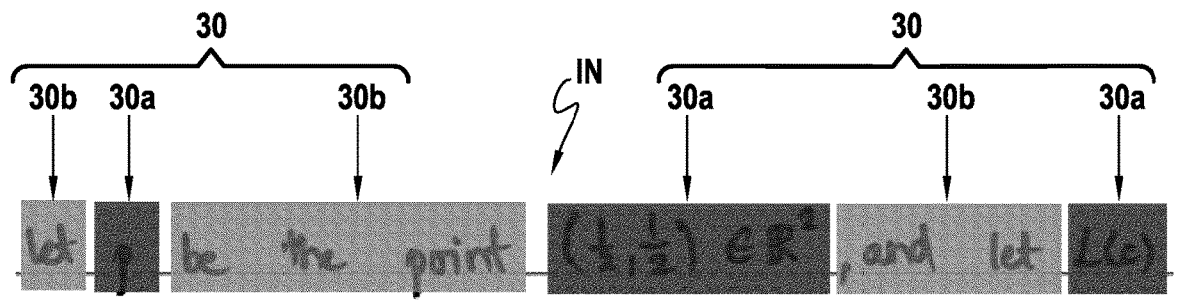
FIG.14
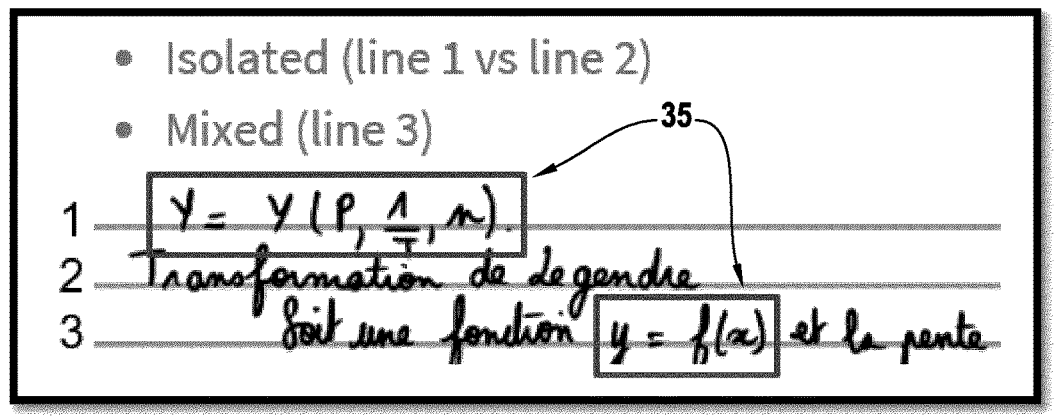
FIG.15

CLASSIFYING HANDWRITTEN MATH AND TEXT SYMBOLS USING SPATIAL SYNTACTIC RULES, SEMANTEC CONNECTIONS, AND INK-RELATED INFORMATION OF STROKES FORMING THE SYMBOLS

CROSS-REFERENCE TO RELATED APPLICATIONS

This application is a U.S. National Phase application under 35 U.S.C. § 371 of International Application No. PCT/EP2021/051838, filed on Jan. 27, 2021; which claims the benefit of priority to European Application No. 20305069.5, filed Jan. 28, 2020; both of which are incorporated herein by reference in their entirety for all purposes.

TECHNICAL FIELD

The present disclosure relates generally to the field handwriting recognition and handwriting processing, and concerns in particular computing devices capable of recognising math and text content in handwriting.

BACKGROUND

Various computing devices have been developed over the years for handwriting input and recognition, i.e. input elements hand-drawn or handwritten by a user, such as text content (e.g., alphanumeric characters) or non-text content (e.g. shapes, drawings). To this end, known computing devices are usually equipped with a touch sensitive surface or the like to enable users to input handwriting content in the form of strokes of digital ink which may be displayed on a display screen.

The user handwriting input may be interpreted using an on-line handwriting recognition system which allows real-time recognition as handwriting is input by the user. Handwriting recognition may for instance be carried out using a cloud-based solution or the like. Alternatively, off-line systems are also known. Once recognised, the computing device may perform any appropriate processing task, such as converting the input strokes into a typeset version for instance or implementing editing functions.

To provide users with a good experience, including display of handwriting, manipulations, editing and the like, it is critical that handwriting input from a user be recognised as accurately as possible. Text classifiers are already known and used for recognising handwritten text, such as handwritten characters, digits, symbols, accents, etc. However, handwriting input may be of various natures, which sometimes renders the task of handwriting recognition delicate.

In particular, handwriting recognition can be challenging when handwriting includes math content or a mix of text and math content. As of today, there is a lack of efficient solutions which recognize both math and text. In particular, a solution to discriminate math and text content in handwriting in an accurate and reliable manner is needed.

SUMMARY OF THE INVENTION

The examples of the present invention that are described herein below provide computing devices, methods and corresponding computer programs for processing math and text in handwriting.

According to a particular aspect, the invention provides a method implemented by a computing device for processing math and text in handwriting, comprising:
    identifying symbols by performing handwriting recognition on a plurality of strokes of digital ink;
    classifying, as a first classification, at least one first symbol from the identified symbols as either a text symbol candidate or a math symbol candidate with a confidence score reaching at least a first threshold by applying individually predefined symbol recognition rules on the symbols;
    classifying, as a second classification, at least one second symbol other than said at least one first symbol as either a text symbol candidate or a math symbol candidate with a respective confidence score by applying, on said at least one first symbol and at least one second symbol, predefined spatial syntactic rules defining spatial relationships between said at least one first symbol and said at least one second symbol;
    updating or confirming, as a third classification, a result of said second classification by establishing semantic connections between at least two symbols from the identified symbols and comparing said semantic connections with the result of said second classification; and
    recognising each symbol as either text symbol or math symbol based at least on a result of said third classification.

The present invention allows recognising math and text in handwriting an efficient and reliable manner. It can be determined with a high degree of confidence which strokes (or symbols) of handwriting input are text content and which are math content. Efficient math/text discrimination is achieved in particular by performing a three-level analysis, namely a symbol analysis, a syntax analysis and a semantic analysis of the handwriting input.

In a particular embodiment, the method comprises, prior to said identifying symbols, acquiring the plurality of strokes of digital ink forming the symbols, said identified symbols comprising at least one text symbol and at least one math symbol.

In a particular embodiment, during said identifying symbols, the plurality of strokes is compared with a set of predefined symbols and each symbol formed by the plurality of strokes is identified as a respective one within a set of predefined symbols.

In a particular embodiment, the method comprises computing, for each identified symbol, ink-related information based on each stroke forming said symbols, said ink-related information comprising:
    symbol information characterising intrinsic properties of the one or more strokes forming said symbol; and
    context information characterising at least one neighbour stroke, spatially-related with the one or more strokes forming said symbol, in accordance with at least one respective ordering of the plurality of strokes;
    wherein said ink-related information are used in at least said second and third classification to classify each symbol as either a math symbol candidate or a text symbol candidate.

In a particular embodiment, the strokes are acquired as online handwriting with temporal information indicative of a temporal order in which the strokes are handwritten relative to each other,
    wherein the context information characterise, for each symbol, at least one neighbour stroke, spatially-related with the one or more strokes forming said symbol, in accordance with at least the temporal order of the plurality of strokes.

In a particular embodiment, said first classification comprises:
determining, for each identified symbol, embedding information attributed by the symbol recognition rules to said symbol, said embedding information comprising a respective confidence score that said predefined symbol is either text or math; and
comparing the respective confidence score of each identified symbol as defined in the embedding information with the first threshold to identify at least one first symbol as either a text symbol candidate or a math symbol candidate with a confidence score reaching at least said first threshold.

In a particular embodiment, during the first classification, each symbol is classified as either a text symbol candidate or a math symbol candidate with a respective confidence score by applying individually the predefined symbol recognition rules.

In a particular embodiment, each symbol identified in the first classification is attributed, based on the predefined symbol recognition rules, embedding information comprising a respective confidence score that said symbol is either text or math.

In a particular embodiment, during said second classification, said spatial syntactic rules are applied on said at least one first symbol to identify as either a math symbol candidate or a text symbol candidate at least one other symbol having a predefined spatial relationships with one or more first symbols.

In a particular embodiment, during said second classification, each symbol other than said at least one first symbol is classified as either a text symbol candidate or a math symbol candidate.

In a particular embodiment, the spatial syntactic rules comprise:
math spatial syntactic rules defining spatial relationships between at least two math symbols; and
text spatial syntactic rules defining spatial relationships between at least two text symbols.

In a particular embodiment, the math spatial syntactic rules comprise at least math spatial syntactic rules defining the following:
fractions comprising a fraction bar separating a numerator component and a denominator component;
superscripts and subscripts associated with one or more symbols positioned respectively to the left-top or left-bottom of one or more base symbols;
overscripts and underscripts associated with one or more symbols positioned respectively over and under one or more base symbols; and
matrices associated with a plurality of rows and columns of symbols arranged in a tabular form.

In a particular embodiment, said second classification comprises at least one of:
applying said math spatial syntactic rules to identify, as a respective math symbol candidate, at least one other symbol having a predefined spatial relationships with at least one (or none to multiple) first symbol identified as a math symbol candidate in the first classification; and
applying said text spatial syntactic rules to identify, as a respective math symbol candidate, at least one other symbol having a predefined spatial relationships with at least one first symbol identified as a math symbol candidate in the first classification.

In a particular embodiment, if the result of the second classification is confirmed during the third classification based on semantic connections, the result produced in the third classification is identical to the result of the second classification.

In a particular embodiment, if the result of the second classification is updated during the third classification based on semantic connections, the result produced in the third classification comprises a modified classification of the symbols as text and symbol candidates relative to the second classification along with respective updated confidence scores,
the method further comprising repeating the second classification on the result of the third classification to either confirm or update said result.

In a particular embodiment, an iterative classifying process comprising the second and third classifications is repeated until said second and third classifications converge to a same result.

In a particular embodiment, if a predefined number N of iterations of the classifying process is reached before the second and third classifications converge to a same result, the latest updated result of the second classification obtained in the third classification is used for recognising each symbol as either text symbol or math symbol, wherein N is an integer of at least 2.

In a particular embodiment, said recognising each symbol as either text symbol or math symbol comprises allocating to each stroke, based at least on the result of said third classification, a classification as either math or text along with an associated confidence score.

In a particular embodiment, the method comprises grouping, based on a result of said recognising, the plurality of strokes into blocks of one or more strokes, each block being either a text block or a math block, wherein each stroke contained in a text block is a part of a text symbol and each stroke contained in a math block is part of a math symbol.

In a particular embodiment, the groups are determined based on the classification of each symbol as math or text as defined in the result of said third classification and based on the spatial proximity of the strokes relative to each other.

In a particular embodiment, the method comprises displaying the plurality of strokes along with boxes representative of the respective blocks to which each stroke belongs.

In a particular embodiment, the method comprises recognising math content and text content in said strokes by applying a math language model to each math block and by applying a text language model to each text block.

According to another aspect, the present inventions relates to a non-transitory computer readable medium having recorded thereon a computer readable program code (or computer program) including instructions for executing the steps of the method of the invention as defined in the present document.

The computer program of the invention can be expressed in any programming language, and can be in the form of source code, object code, or any intermediary code between source code and object code, such that in a partially-compiled form, for instance, or in any other appropriate form.

The invention also provides a computer program as mentioned above.

The non-transitory computer readable medium previously mentioned can be any entity or device capable of storing the computer program. For example, the recording medium can comprise a storing means, such as a ROM memory (a CD-ROM or a ROM implemented in a microelectronic circuit), or a magnetic storing means such as a floppy disk or a hard disk for instance.

The non-transitory computer readable medium of the invention can correspond to a transmittable medium, such as an electrical or an optical signal, which can be conveyed via an electric or an optic cable, or by radio or any other appropriate means. The computer program according to the disclosure can in particular be downloaded from the Internet or a network of the like.

Alternatively, the non-transitory computer readable medium can correspond to an integrated circuit in which a computer program is loaded, the circuit being adapted to execute or to be used in the execution of the methods of the invention.

In a particular embodiment, the invention relates to a non-transitory computer readable medium having a computer readable program code embodied therein, said computer readable program code being adapted to be executed to implement a method for processing math and text in handwriting on a computing device as defined in the present document, the computing device comprising a processor for executing the steps of said method.

The present invention also relates to a computing device suitable to implement the method as defined in the present disclosure. More particularly, the present invention provides a computing device for processing math and text in handwriting, comprising:
- a first recognition module for identifying symbols by performing handwriting recognition on a plurality of strokes of digital ink;
- a symbol processing module for classifying, as a first classification, at least one first symbol from the identified symbols as either a text symbol candidate or a math symbol candidate with a confidence score reaching at least a first threshold by applying individually predefined symbol recognition rules on the symbols;
- a syntax processing module for classifying, as a second classification, at least one second symbol other than said at least one first symbol as either a text symbol candidate or a math symbol candidate with a respective confidence score by applying, on said at least one first symbol and said at last one second symbol, predefined spatial syntactic rules defining spatial relationships between said at least one first symbol and said at least one second symbol; and
- a semantic processing module for updating or confirming, as a third classification, a result of said second classification by establishing semantic connections between at least two symbols from the identified symbols and comparing said semantic connections with the result of said second classification;
- said computing device being configured to recognise each symbol as either text symbol or math symbol based at least on a result of said third classification.

The various embodiments defined above in connection with the method of the present invention apply in an analogous manner to the computing device, the computer program and the non-transitory computer readable medium of the present disclosure.

For each step of the method of the present invention as defined in the present disclosure, the computing device may comprise a corresponding module configured to perform said step.

In a particular embodiment, the disclosure may be implemented using software and/or hardware components. In this context, the term "module" can refer in this disclosure to a software component, as well as a hardware component or a plurality of software and/or hardware components.

BRIEF DESCRIPTION OF THE DRAWINGS

Other characteristics and advantages of the present disclosure will appear from the following description made with reference to the accompanying drawings which show embodiments having no limiting character. In the figures:

FIGS. 7-11, 12A, 12B, 12C, 13 and 14-15 depict different steps of a method for processing math and text in handwriting according to a particular embodiment of the present invention;

Figure 1:
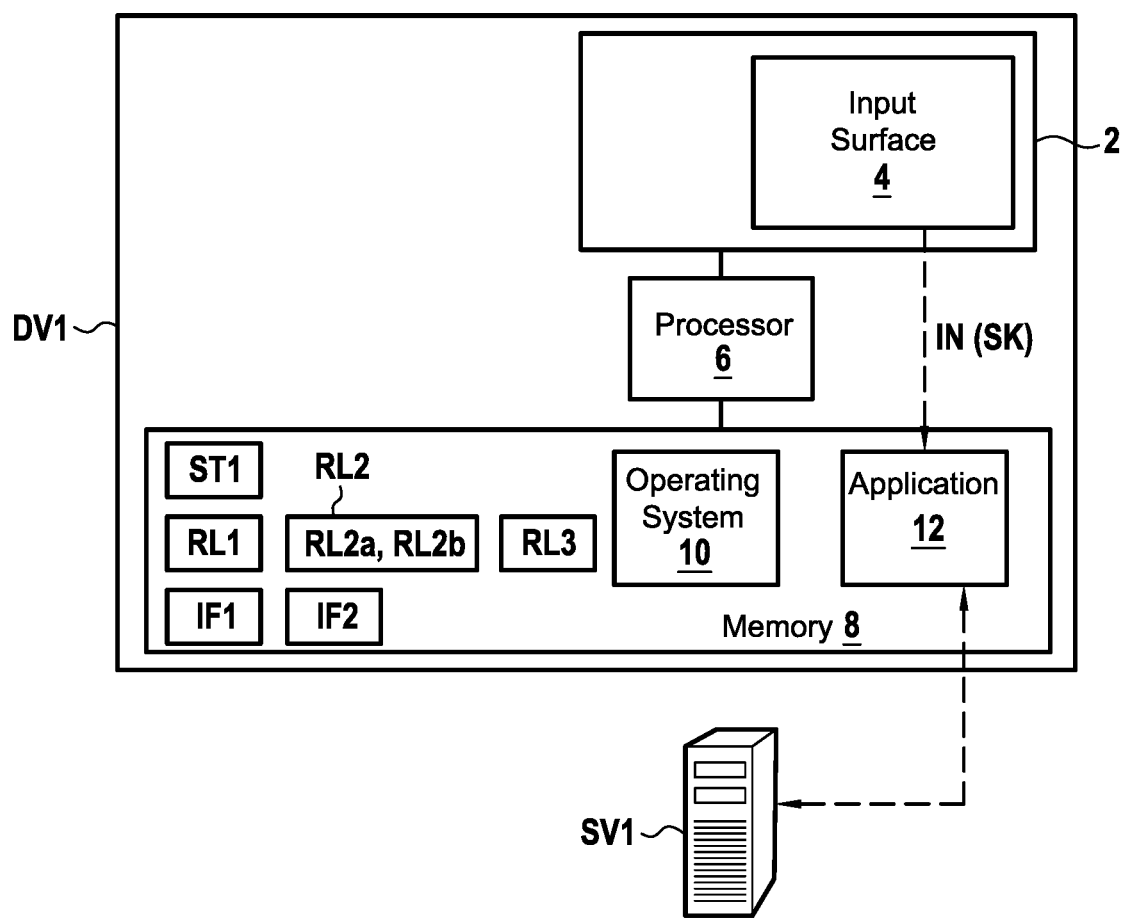
FIG. 1 is a block diagram of a computing device according to a particular embodiment of the present invention.

The components in the figures are not necessarily to scale, emphasis instead being placed upon illustrating the principles of the present invention.

For simplicity and clarity of illustration, the same reference signs will be used throughout the figures to refer to the same or analogous parts, unless indicated otherwise.

DESCRIPTION OF PARTICULAR EMBODIMENTS OF THE INVENTION

In the following detailed description, numerous specific details are set forth by way of examples in order to provide a thorough understanding of the relevant teachings. However, it should be apparent to those skilled in the art that the present teachings may be practiced without such details. In other instances, well known method, procedures, and/or components are described at a relatively high-level, without detail, in order to avoid unnecessarily obscuring aspects of the present teachings.

The following description of the exemplary embodiments refers to the accompanying drawings. The following detailed description does not limit the invention. Instead, the scope of the invention is defined by the appended claims. In various embodiments as illustrated in the figures, a computing device, a corresponding method and a corresponding computer program are discussed.

The terms "hand-drawing" and "handwriting" are used interchangeably herein to define the creating of digital contents (handwriting input) by users through use of their hands (or fingers) or an input device (hand-held stylus or digital pen, mouse . . . ) on or with an input surface. The term "hand" or the like is used herein to provide concise description of the input techniques, however the use of other parts of a user's body for similar input is included in this definition, such as foot, mouth and eye.

Handwriting is formed by strokes of digital ink input by a user. A stroke (or input stroke) is characterised by at least a stroke initiation location (corresponding to a "pen down" event), a stroke terminal location (corresponding to a "pen up" event), and the path connecting the stroke initiation and the stroke terminal locations.

The term "text" in the present disclosure is understood as encompassing all characters (e.g. alphanumeric characters or the like), and strings thereof, in any written language and, more generally, any symbols used in written text. Text thus includes base characters and accents from any script, such as Latin scripts, Cyrillic scripts, Chinese scripts, and so on.

The term "math" (or mathematics) is understood in the present disclosure as encompassing any math symbols, or string of math symbols, in any language, i.e. any symbols used for expressing math content, math expressions or anything of mathematic nature.

Particular examples of text and math content will be provided in more details below.

Furthermore, the examples shown in these drawings are in a left-to-right written language context, and therefore any reference to positions can be adapted for written languages having different directional formats.

The various technologies described herein generally relate to processing handwritten on portable and non-portable computing devices, more particularly for the purpose of recognising math and text. Whilst the various embodiments are described with respect to recognition of digital ink handwriting input using so-called online recognition techniques, it is understood that other forms of input for recognition may be applied, such as offline recognition involving a remote device or server to perform recognition.

The systems and methods described herein may utilise recognition of user's natural handwriting styles input to a computing device via an input surface, such as a touch sensitive screen (as discussed later).

As described in more details below, an aspect of the present invention concerns processing math and text in handwriting. The method is based on three symbol classifications of different nature, namely classifications at a symbol representation level, at a syntax level and at a semantic level, to enable accurate and reliable recognition of text and math symbols in handwriting.

More particularly, the method may involve identifying symbols by performing handwriting recognition on a plurality of strokes of digital ink; performing a first classification at a symbol level to classify at least one first symbol as either a text symbol candidate or a math symbol candidate with a confidence score reaching at least a first threshold; performing a second classification at a syntax level to classify at least one second symbol other than said at least one first symbol as either a text symbol candidate or a math symbol candidate with a respective confidence score based on spatial relationships between said at least one first symbol and said at least one second symbol; and performing a third classification at a semantic level to update or confirm a result of the second classification based semantic connections established between at least two symbols; and recognising each symbol as either text symbol or math symbol based at least on a result of said third classification.

FIG. 1 shows a block diagram of a computing device DV1 according to a particular embodiment of the present invention. The computing device (or digital device) DV1 may be a computer desktop, laptop computer, tablet computer, e-book reader, mobile phone, smartphone, wearable computer, digital watch, interactive whiteboard, global positioning system (GPS) unit, enterprise digital assistant (EDA), personal digital assistant (PDA), game console, or the like. The computing device DV1 may include components of at least one processing elements, some form of memory and input and output (I/O) devices. The components communicate with each other through inputs and outputs, such as connectors, lines, buses, links networks, or others known to the skilled person.

More specifically, the computing device DV1 comprises an input surface 4 for handwriting (or hand-drawing) content IN, which may be text content, math context or a mix of text and math content, as described further below. The input surface 4 is suitable to detect a plurality of strokes SK of digital ink entered on (or using) said input surface.

The input surface 104 may employ any appropriate technology such as resistive, surface acoustic wave, capacitive, infrared grid, infrared acrylic projection, optical imaging, dispersive signal technology, acoustic pulse recognition, or any other appropriate technology as known to the skilled person to receive user input in the form of a touch- or proximity-sensitive surface. The input surface 4 may be a non-touch sensitive surface which is monitored by a position detection system.

The computing device 100 also comprises at least one display unit (or display device) 2 for outputting data from the computing device DV1 such as handwriting IN. The display unit 2 may be a screen or the like of any appropriate technology (LCD, plasma . . . ). The display unit 2 is suitable to display strokes SK of digital ink input by a user.

The input surface 4 may be co-located with the display unit 2 or remotely connected thereto. In a particular example, the display unit 2 and the input surface 4 are parts of a touchscreen.

As depicted in FIG. 1, the computing device DV1 further comprises a processor 6 and a memory 8. The computing device DV1 may also comprise one or more volatile storing elements (RAM) as part of the memory 8 or separate thereof.

The processor 6 is a hardware device for executing software, particularly software stored in the memory 8. The processor 8 can be any custom made or general purpose processor, a central processing unit (CPU), a semiconductor based microprocessor (in the form of microchip or chipset), a microcontroller, a digital signal processor (DSP), an application specific integrated circuit (ASIC), field programmable gate array (FPGA) or other programmable logic device, or any combination thereof, and more generally any appropriate processor component designed for executing software instructions as known to the skilled person.

The memory 8 is a non-transitory (or non-volatile) computer readable medium (or recording medium) in accordance with a particular embodiment of the disclosure. The memory 8 may include any combination of non-volatile storing elements (e.g. ROM, EPROM, flash PROM, EEPROM, hard drive, magnetic or optical tape, memory registers, CD-ROM, WORM, DVD, or the like).

The memory 8 may be remote from the computing device DV1, such as at a server or cloud-based system, which is remotely accessible by the computing device DV1. The non-volatile memory 8 is coupled to the processor 6, so that the processor 6 is capable of reading information from and writing information to the memory 8. As an alternative, the memory 8 is integral to the computing device 8.

The memory 8 includes an operating system (OS) 10 and a handwriting application (or computer program) 12. The operating system 10 controls the execution of the application 12. This application constitutes (or comprises) a computer program (or computer-readable program code) according to a particular embodiment of the invention, this computer program comprising instructions to implement a method according to a particular embodiment of the invention.

In the present embodiment, the application 12 includes instructions for processing math and text in handwriting IN which is acquired in appropriate manner. In the present example, handwriting IN which is to is processed may be strokes SK of digital ink handwritten by a user using the input surface 4 of the computing device 100, as discussed further below. In a variant, the handwriting IN at hand is acquired by the computing device DV1 but is not input through the input surface 4.

As depicted in FIG. 1, the non-volatile memory 8 is suitable to store various data acquired by the computing device 2, including a set (or data set) ST1 of predefined symbols, a set of predefined symbol recognition rules RL1, a set of predefined spatial syntactic rules RL2 and a set of predefined semantic rules RL3. The memory 8 may also store ink-related information IF1 and/or embedding information IF2. The nature and use of these features will be described in more details hereafter.

Figure 2:
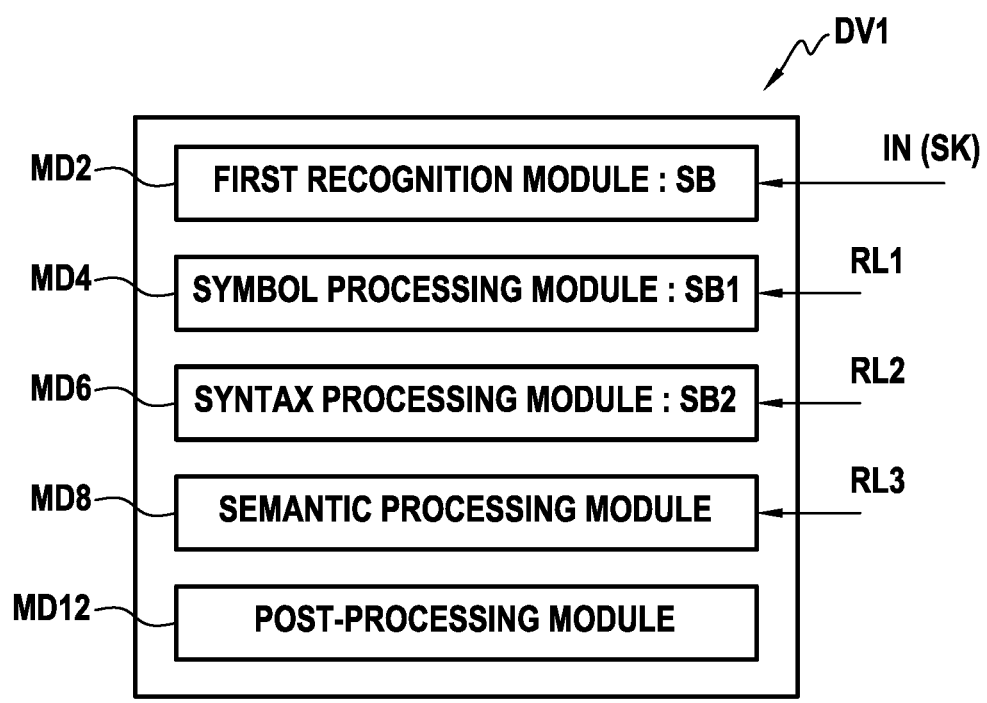
FIG. 2 is a block diagram representing functional modules implemented by a computing device, according to a particular embodiment of the present invention.

As shown in FIG. 2 according to a particular embodiment, when running the application 12 stored in the memory 108 (FIG. 1), the processor 6 implements modules, namely: a first recognition module MD2, a symbol processing module MD4, a syntax processing module MD6, a semantic processing module MD8 and optionally a post-processing module MD12.

The first recognition module MD2 may be configured to identify symbols SB by performing handwriting recognition on a plurality of strokes SK of digital ink.

The symbol processing module MD4 may be configured to classify, as a first classification, at least one first symbol SBa from the identified symbols SB as either a text symbol candidate or a math symbol candidate with a confidence score reaching at least a first threshold. This first classification may be performed by applying individually predefined symbol recognition rules RL1 on the symbols SB identified by the first recognition module MD2.

The syntax processing module MD6 may be configured to classify, as a second classification, at least one second symbol SBb other than said at least one first symbol SBa as either a text symbol candidate or a math symbol candidate with a respective confidence score. This second classification may be performed by applying, on said at least one first symbol SBa and said at last one second symbol SBb, predefined spatial syntactic rules RL2 defining spatial relationships between said at least one first symbol SBa and said at least one second symbol SBb.

The semantic processing module MD8 may be configured to update or confirm, as a third classification, a result of said second classification by establishing semantic connections between at least two symbols from the identified symbols SB and comparing said semantic connections with the result of said second classification.

The computing device DV1 is configured to recognise each symbol SB as either text symbol or math symbol based on (or at least on) a result of said third classification.

The post-processing module MD12 may be configured to perform post-processing operations on the strokes SK once the recognition by the processing modules MD4, MD6 and MD8 is completed.

The application 12 comprises instructions configuring the processor 6 to implement the above-mentioned modules MD2-MD12 in order to perform steps of a method of the invention, as described later in particular embodiments.

The modules MD2-MD12 may each be or comprise one or more neural networks. In the present example, each module MD4, MD6 and MD8 are executed by neural networks.

The configuration and operation of the modules MD2-MD12 of the computing device DV1 will be more apparent in the particular embodiments described hereinbelow with reference to the figures. It is to be understood that the modules MD2-MD12 as shown in FIG. 2 represent only an example embodiment of the present invention, other implementations being possible.

For each step of the method of the present invention, the computing device DV1 may comprise a corresponding module configured to perform said step.

A method implemented by the computing device DV1 illustrated in FIGS. 1 and 2 is now described with reference to FIGS. 3-15, in accordance with particular embodiments of the present invention. More specifically, the computing device DV1 implements this method by executing the application 12 stored in the memory 8.

An example scenario is considered where the computing device DV1 acquires handwriting IN and implements the handwriting recognition application 12 to detect math in the acquired handwriting IN and, more particularly, to recognise math and text context in said handwriting IN.

More specifically, in an acquisition step S2 (FIG. 3), the computing device DV1 acquires handwriting IN in the form of digital ink. The acquired handwriting input IN is formed by a plurality of strokes SK of digital ink. These strokes SK constitute a digital representation of the handwriting IN. It is assumed that the acquired set of strokes SK form at least one handwritten line (one line in this example) extending along a respective baseline 20.

Figure 4:
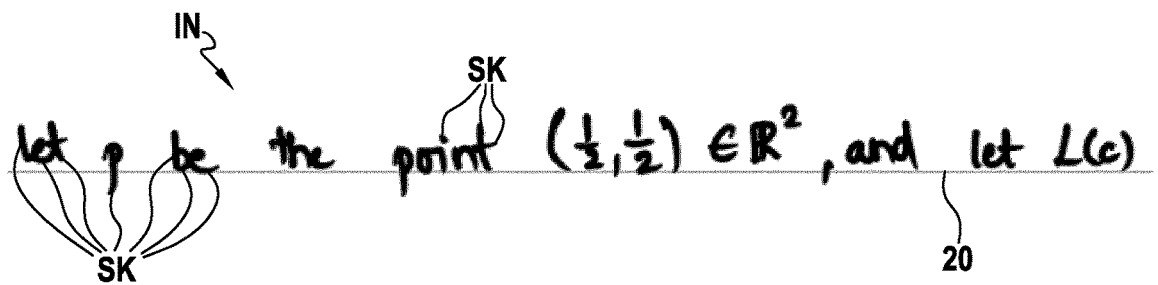
FIGS. 4 and 5 depicts different steps of a method for processing math and text in handwriting according to a particular embodiment of the disclosure.

The computing device DV1 thus displays the acquired strokes ST on the display 2 as shown in FIG. 4.

As already indicated, each input stroke SK is characterised by at least a stroke initiation location, a stroke terminal location and the path connecting the stroke initiation and the stroke terminal locations. Accordingly, the dot positioned for instance at the top of the character "i" (in the word "point") constitutes a single stroke SK by itself.

In the present example, we consider that the input strokes SK acquired in S2 form the following handwritten phrase as shown in FIG. 4:

"let p b the point (½, ½) ∈ $\mathbb{R}^2$, and let L(c)"

As can be seen, the acquired handwriting IN extends along (or substantially along) a baseline 20. The acquired handwriting IN in this case is an expression or phrase in a written language (English), forming a handwritten line and comprising various symbols as described further below. In the present example, it is assumed that the text content is single baselined while the math content is either single or multiple baselined. It should be considered however that this constitutes a mere example, numerous other types, content and form of handwriting being possible, notably in terms of language, style, format, etc. In particular, various spatial arrangements of the strokes SK relative to each other may be contemplated (e.g. various handwriting orientations, sizes).

It is assumed in the present case that the plurality of strokes ST of digital ink is input by a user in an input area of the display 2 using the input surface 104 of the computing device DV1. A user may enter an input stroke SK with a hand or finger, or with some input instrument such as a digital pen or stylus suitable for use with the input surface 4. The user may also enter an input stroke SK by making a gesture above the input surface 4 if means configured to sense motions in the vicinity of the input surface 4 is being used, or with a peripheral device of the computing device DV1, such as a mouse or a joystick or the like.

It should be understood that the computing device DV1 may however acquire handwriting IN in any other appropriate manner.

In the present example, the computing device DV1 acquires the strokes SK as they are input by the user with the input surface 4 to perform on-line handwriting recognition. The computing device DV1 detects and processes handwriting (text and math content) at a line level, although various implementations are possible. As described further below, temporal information characterising how the strokes SK are input relative to each other over time is thus acquired by the computing device DV1 for later processing.

It should be noted, however, that the present invention may apply in an analogous manner to off-line handwriting recognition, i.e. by performing the concept of the invention on an image of handwriting which thus forms a static representation of handwriting. Temporal information regarding how the strokes are input relative to each other over time is thus not directly available. The concept of the invention may thus be applied without using such temporal information or, alternatively, by recovering the strokes from the image and generating temporal information in any appropriate artificial way, e.g. by training a neural network using handwritten images and their known temporal information.

In an identifying step S4 (FIGS. 3 and 5), the computing device DV1 identifies symbols SB by performing handwriting recognition on the acquired strokes SK of digital ink. The handwriting recognition S4 is performed by the first recognition module MD2 which may be or comprise a recognition classifier.

Figure 5:
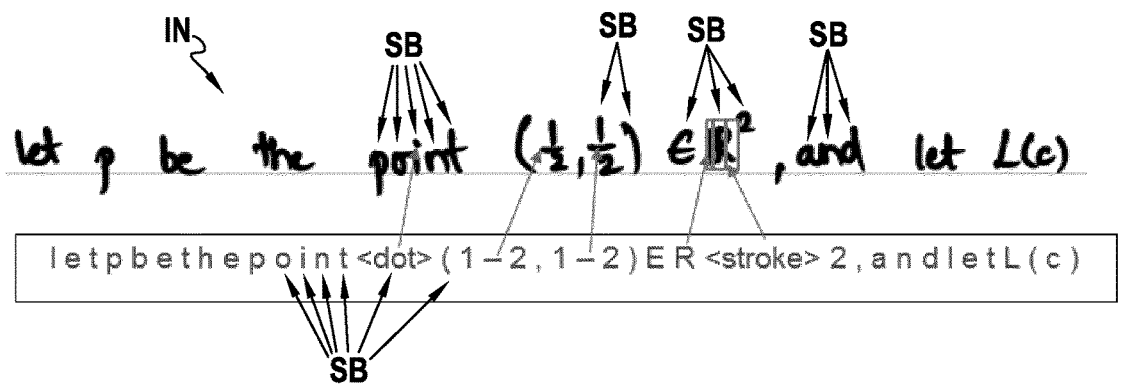

FIG. 5 shows in the present example the sequence of symbols SB identified (S4) by the computing device DV1 based on the strokes SK.

Each symbol SB is formed by one or a plurality of input strokes or at least by a portion of a stroke SK. Additionally, each symbol SB may be either a text symbol or a math symbol, depending on the nature of the symbol and the context within which it is used.

An aim of the method is to differentiate math symbols from text symbols among the identified symbols SB. In the present case, it is considered that the identified symbols SB comprise at least one text symbol and at least one math symbol. It should be noted however that the invention may also apply in case where only math content or where only text content is recognised in the acquired handwriting IN.

To perform the handwriting recognition S4, a set (or data set) ST of predefined symbols PSB as mentioned earlier is used. More particularly, the strokes SK acquired in S2 are compared with the set ST of predefined symbols PSB and each symbol SB formed by the plurality of strokes SK is identified in S4 as a respective one within the set ST of predefined symbols PSB. In other words, the computing device DV1 matches the various strokes SK acquired in S2 (taking either portions of strokes, full strokes or group of strokes) with any predefined symbol PSB as defined in the data set ST. To this end, the computing device DV1 consults the pre-stored data set ST and makes various comparisons between the data set ST and the acquired strokes SK.

It follows that each symbol SB that may be acquired in S4 has a learnable representation from the data set ST.

Each predefined symbol PSB occurs only once within the data set ST. The predefined symbol PSB may each be a so-called pure text symbol (i.e. a symbol that is only or mostly used as text), a so-called pure math symbol (i.e. a symbol that is only or mostly used as math) or a mix text/math symbol that may be used as math or text depending on the context. As indicated further below, each predefined symbol PSB may be allocated embedding information IF2 by the symbol recognition rules RL1, where the embedding information IF2 comprise a confidence score that said predefined symbol PSB is either text or math.

Any appropriate non-empty data set ST may be used, bearing in mind that this may vary depending on each case. The data set ST may be custom built to take account math and text properties. The data set ST is preferably built to facilitate math and text discrimination by including symbols from math and multiple scripts. The data set ST may comprise symbols from any language or script, digits, accents, accent variants of multiple characters, math operators, math symbols, Greek letters which are often used in math expressions, and so on.

This data set ST may be designed to make the system robust to human manipulation of ink and to noise, for instance by including therein new symbols to detect delayed strokes, symbol character strokes (e.g., accents, multi stroke character and/or spurious strokes).

Figure 6:
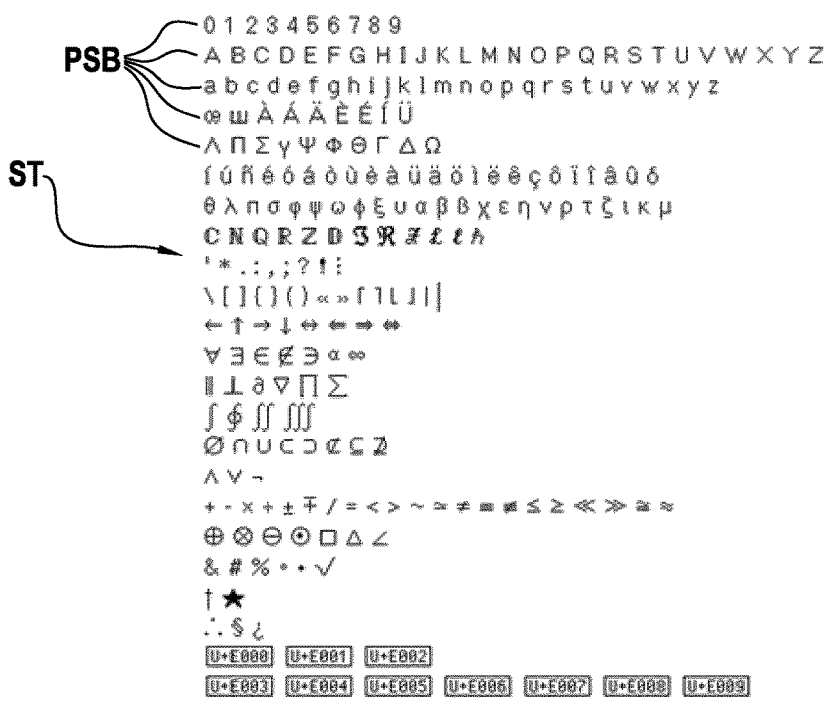
FIG. 6 shows a set of predefined symbols, according to a particular embodiment of the present invention.

In the present example, the data set ST used for symbol recognition in S4 is shown in FIG. 6. In particular, the data set ST may comprise the following symbols (or at least one or several of the following symbol types):

digits (e.g. from "0" to "9");

characters from any language or script, such as alphanumeric characters (e.g. "a" to "z" and "A" to "Z"), Cyrillic characters, Chinese characters, etc.;

mathematical operators (e.g., N-ary math operators) and mathematical symbols (e.g., "+", "=", "−", "*", "(",")", "[","]", "{","}");

letter based symbols, such as like Greek and Hebrew characters for instance;

letter modifiers such as bars, arcs, and the like;

any combination of at least two of the above symbols, such as:

combinations of alphanumeric characters defining standard math function such as sin, cos, tan, lim, etc.;

combinations which hold some mathematical property in the given context like variables names, units, etc.; and symbols participating in spatial arrangements like matrices, fractions, super/subscripts, multi-line system of equations, etc.

As can be seen in the data set ST of FIG. 6, some predefined symbols PSB may be regarded as pure math symbols (e.g., "∈", "=", "+") in the present data set ST since they are usually used in a mathematical context.

To identify the symbols SB in the identifying step S4, the computing device DV1 may perform the handwriting recognition on the acquired strokes SK in any suitable manner, using for instance a sequential classifier. Each recognised symbol SB in S4 may be coupled with a respective recognition cost representative of the level of confidence or relevance of the recognition, for later use in the method. Because different users may naturally write a same symbol with slight variations, the results produced in the handwriting recognition in S4 are not always certain. The symbol classifier is preferably able to accommodate a variety of ways in which each symbol may be entered whilst being still recognised as the correct or intended symbol.

In the present case, the application 12 comprises the first recognition module MD2 which operates as the symbol classifier in S4 to perform the handwriting recognition. Alternatively, the first recognition module MD2 may be a module for communicating with a handwriting recognition system remote from the computing device DV1, such as a server SV1 as depicted in FIG. 1 which is remotely accessible by the computing device DV1 through an appropriate communication link.

The nature and implementation of the handwriting recognition process performed by the first recognition module MD2 may vary depending on each case. Handwriting recognition may be performed either fully locally on the computing device DV1 or at least partially remotely using for instance the remote server SV1 (FIG. 1).

Figure 3:
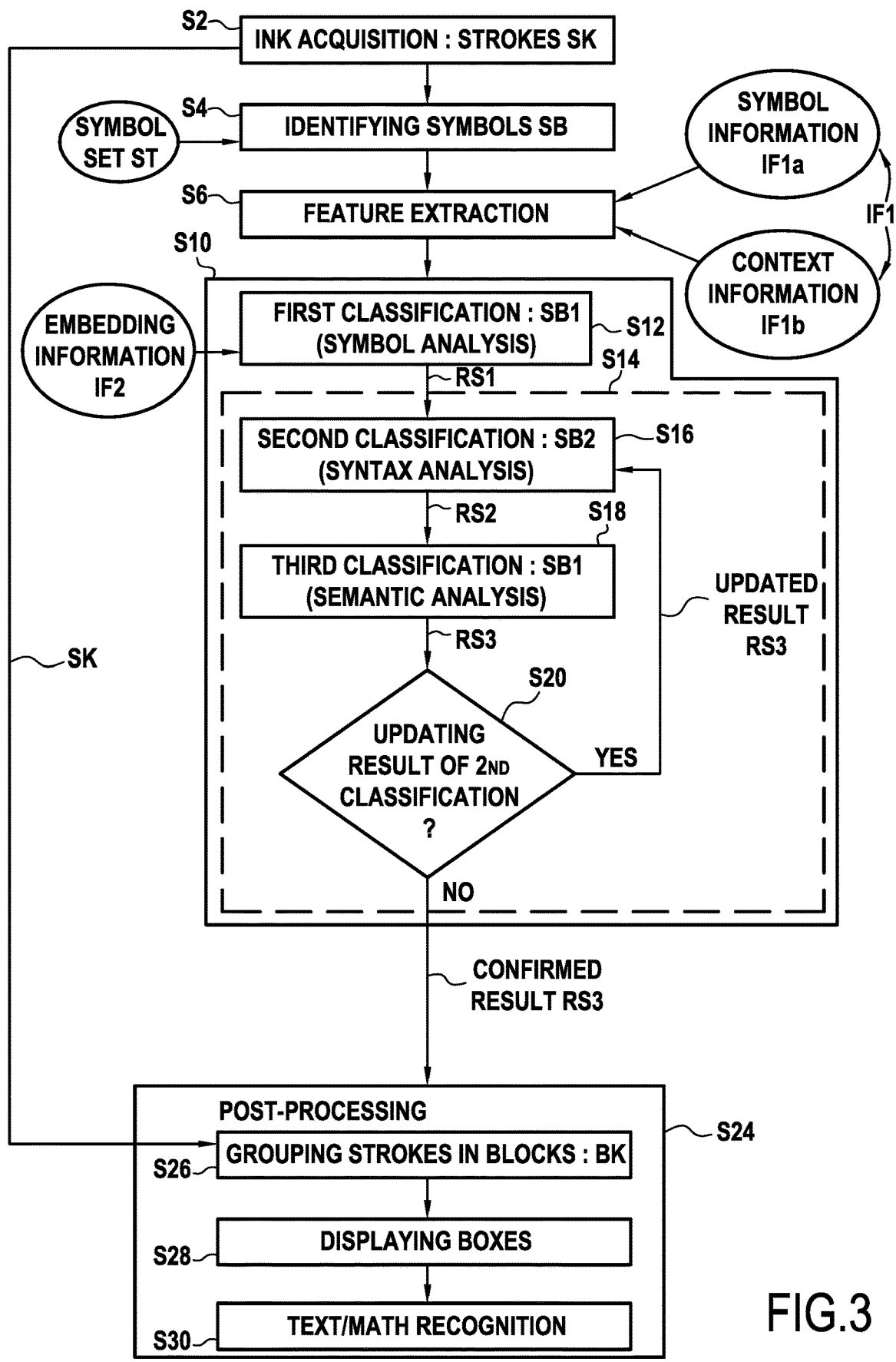
FIG. 3 is a flow chart illustrating the steps of a method for processing math and text in handwriting according to a particular embodiment of the present invention.

In a feature extraction step S6, the computing device DV1 performs feature extraction on the identified symbols SK to obtain ink-related information IF1 representative of the digital ink forming each symbol SK. In other words, the ink-related information IF1 are representative of how an associated symbol SB is handwritten in the present case. This feature extraction step S6 may be performed as part of the identifying step S4 or at least partially before the identifying step S4. The ink-related information IF1 are obtained in S6 for later use during the forthcoming classification process S10 (FIG. 3).

In the present example, during the feature extraction step S6, the computing device DV1 computes, for each symbol SB identified in S4, ink-related information IF1 based on each stroke SK forming said symbols. For each symbol SB, the associated ink-related information IF1 may comprises:
   symbol information IF1a characterising intrinsic properties of the one or more strokes SK forming said symbol SB; and
   context information IF1b characterising at least one other (or neighbour) stroke SK, spatially-related with the one or more strokes SK forming said symbol SB, in accordance with at least one respective ordering of the plurality of strokes SK.

The ink-related information IF1 obtained in S6 may be used in at least the forthcoming second classification S16 and third classification S18—and possibly in the first classification S12 as well—to classify each symbol SB as either a math symbol candidate or a text symbol candidate (as discussed further below).

More specifically, the symbol information IF1a characterise the associated symbol SK itself, i.e. its intrinsic properties of the one or more constitutive stroke SK irrespective of surrounding ink in the handwriting IN. The symbol information IF1a may comprise any one (or all) of the following categories: classification features, symbol positional features and symbol description features.

The above-mentioned classification features comprise the recognition cost(s) allocated by the recognition classifier (the first recognition module MD2) to the respective symbol SB during the handwriting recognition S2. If additional classifiers are used to process ink or symbols (such as baseline vs non-baseline stroke labelling), more costs can be added into the classification features in association with each symbol SB.

The above-mentioned symbol positional (or spatial) features comprise information related to the position of the associated symbol SB with respect to the baseline 20 (e.g., height distance from baseline, distance from beginning of baseline . . . ). For instance, in the present example (FIGS. 5-6) the symbol "2" in the expression "ℝ $^2$" may be characterised and recognised as superscript because it is above a threshold distance from the baseline 20. The baseline 20 may be computed by any suitable manner, for instance by analysing all strokes SK in the handwritten line. A local baseline may also be computed by analysing only some strokes SK in a particular region of the handwritten line, i.e.  in the vicinity of a stroke or symbol of interest. This local baseline can facilitate capture of local variations to better detect deviations like super and subscript in lines, especially in lines having a great number of strokes. It is possible to use an algorithm to compute the baseline 20 or a local baseline by computing the line which is the mean of centroids of all strokes in a particular region of interest.

The above-mentioned symbol description features comprise descriptive features for each stroke SK contained in a given symbol SK. Such information may comprise for instance binary or point-count bitmap of the associated symbol SK and its surrounding. The symbol description features may also comprise handcrafted features computed by the computing device DV1 from the digital ink of the symbol, for instance the minimum, maximum and/median of strokes or portions of strokes.

Further, as indicated earlier, context information IF1b characterise at least one other (or neighbour) stroke SK, spatially-related with the one or more strokes SK forming said symbol SB, in accordance with at least one respective ordering of the plurality of strokes SK. The context information IF1b may comprise symbol context features characterising relative features of the symbol SK of interest with one or more other neighbour symbols SK.

Various ordering of the strokes SK may be used to generate the context information IF1b. For instance, the computing device DV1 may select any one of the following ordering to define context information IF1b for each symbol SK: a symbol classification default order (i.e. the symbol output order according to which the symbols SB are recognised in S4 by the first recognition module MD2), a spatial order representative of the relative position of each symbol SB with the acquired handwriting IN (e.g., the X position along the baseline 20), and a temporal order representative of the relative time or relative order at which each symbol SB has been input (e.g., using the most recent stroke SK of each symbol SK to index and sort the symbols). For any selected ordering, the above-mentioned symbol context features may be computed for each symbol SB with respect to at least one other neighbouring features (e.g., considering the stroke immediately before and the stroke immediately after the symbol of interest).

As indicated earlier, it is assumed in the present case that the strokes SK are previously acquired in S2 (FIG. 3) as online handwriting with temporal information indicative of a temporal order in which the strokes SK are handwritten relative to each other. Accordingly, the above-mentioned context information may characterise, for each symbol SB recognised in S4, at least one neighbour stroke SK, spatially-related with the one or more strokes SK forming said symbol SB, in accordance with at least the temporal order of the plurality of strokes SK.

The symbol context features may for instance comprise any one (or all) of the following:
   share stroke information representative of shared strokes between a symbol of interest and at least one neighbouring symbol;
   displacement information representative of relative displacements (e.g., along the orientation X of the baseline 20 and/or along an orientation Y perpendicular to X) of the symbol of interest with respect to at least one neighbouring symbol;
   overlap information representative of overlap (e.g., along the orientation X of the baseline 20 and/or along an orientation Y perpendicular to X) of the symbol of interest with respect to at least one neighbouring symbol; and distance information representative of the distance between the respective centres of gravity of the symbol of interest and at least one neighbouring symbol.

The symbol context features may capture various types of symbols and handwriting style, such as cursive text, space between symbols, spatial relationships like sub and super scripts, fractions between math symbols, etc.

As can be seen from the foregoing, the ink-related information IF1 extracted in step S6 (FIG. 3) from each identified symbol SB based on the corresponding strokes SK may be of various nature depending on each case. The symbol information IF1a and the context information IF1b are thus merely provided by way of examples, other implementations being possible.

In a classification process S10 (FIGS. 3 and 7), the computing device DV1 then classifies each symbol SB identified in S4 as either a text symbol candidate or a math symbol candidate, based on the ink-related information IF1 computed in S6 and based on embedding information IF2 attributed to each acquired symbol SB as described further below. The classification process S10 employs three different expert modules, i.e. the processing modules MD4, M6 and MD8, to perform classifications at respectively three different levels, i.e. a first classification S12 at a symbol representation level, a second classification S14 at a syntactic level and a third classification S18 at a semantic level.

More specifically, in a first classification S12, the computing device DV1 classifies at least one first symbol—noted SB1—from the identified symbols SB as either a text symbol candidate or a math symbol candidate with a confidence score reaching at least a first threshold TH1 by applying individually predefined symbol recognition rules RL1 on the symbols SB.

The first classification S12 is based on a symbol-level analysis which does not require analysis of the context of each symbol SB of interest. Accordingly, the symbol context information IF1b computed in S6 are not used in the first classification S12. The symbols SB are classified based on their intrinsic properties, based for instance on the symbol information IF1a obtained in S6. In a particular example, the ink-related information IF obtained in S6 is not used in the first classification S12.

In substance, the computing device DV1 searches in step S12 for each symbol SB which can be classified as either a text symbol candidate or a math symbol candidate with a relatively good degree of confidence.

As previously indicated, each symbol SB identified in S4 is recognised as one of the predefined symbols PSB of the data set ST (FIG. 6). Each of the identified symbols SB may thus be a pure math symbol SB that is most likely used as math, a pure text symbol SB that is most likely used a text, or an ambiguous mix math/text symbol that may be used as either math or text depending on the context. The first classification S12 allows identifying each symbol among the identified symbols SB that amount to a pure text symbol or pure math symbol, that is, each symbol with a likelihood equal to or higher than a first threshold TH1 that it is text or that it is math. It should be noted that a pure math symbol may still have a very low—non zero—likelihood to be used as text in some very specific circumstances, and vice versa for pure text symbols. Accordingly, the first threshold TH1 may be predefined at any suitable probability value, for instance between 90% and 100%, for instance at about 95%.

The first classification S12 thus produces, as a first result RS1, an initial text/math labelling (or classification) of one or more symbols—called first symbols SB1—with relatively good confidence score by applying the predefined symbol recognition rules RL1 pre-stored in memory 8. In this first result RS1, each of these first symbols SB1 is thus classified as either a math symbol candidate or a text symbol candidate with a respective confidence score relatively high, i.e. reaching at least the predefined first threshold TH1. As described further below, these initial classification and respective confidence score may be updated later in the classification process S10.

In the present example, the predefined symbol recognition rules RL1 attribute (or assign), to each one of the set of predefined symbols PSB, embedding information IF2 comprising a respective confidence score that said predefined symbol is either text or math. In other words, the embedding information IF2 define for each predefined symbol PSB of the data set ST embedding information IF2 comprising a classification as either text or math along with an associated confidence score. These embedding information IF2 may be pre-learned using a recurrent neural network. Confidence score of each predefined symbol PSB of the data set ST may be pre-computed based on the symbol's own frequency of occurrence in text or math expressions and based on the symbol's intrinsic properties. During a training process, the text/math classification and associated confidence score may be updated iteratively with handwritten ink samples, for instance based on the backpropagated gradient of the neural network.

The predefined symbol recognition rules RL1 may attribute, to each predefined symbol PSB of the data set ST, additional information in the embedding information IF2 useful for classification as text or math. These additional complementary information may comprise any suitable discriminative linguistic information relative to math and text symbols.

Similar predefined symbols PSB can be defined as part of a same symbol group sharing same embedding information IF2, or at least a same text/math classification and a same associated confidence score. For instance, the symbols "(", "[" and "{" which are of similar nature may share same embedding information IF2. The size of embedding information IF2 can be adjusted depending on each case to maximize performances of the neural network and minimize computational time and resources.

In the present example, during the first classification S12 (FIG. 3), the computing device DV1 may thus determine, for each symbol SB identified in S4, embedding information IF2 attributed by the symbol recognition rules RL1 to said symbol, these embedding information IF2 comprising a respective confidence score that said predefined symbol is either text or math. The computing device DV1 may then compare the respective confidence score of each identified symbol SB as defined in the embedding information IF2 with the first threshold TH1 to identify at least one first symbol SB1 as either a text symbol candidate or a math symbol candidate with a confidence score attaining (equal or greater than) the first threshold TH1.

In a particular example, the ink-related information IF1 and the embedding information IF2 are fed together as an information set or information vector to the processing modules MD4, MD6 and MD8 for performing respectively the first, second and third classification S12-S18.

Since the first classification S12 allows identifying symbols SB which occur only (or mostly) in math or only (or mostly) in text, a partial text/math labelling with good confidence can be achieved. In most cases, some symbols SB will be mix math/text symbols and will thus not be assigned a text/math classification with a respective confidence score at this stage.

In the example shown in FIG. 7, during the first classification S12, the symbols "∈" and "ℝ" are classified as math symbol candidates with a respective confidence score reaching at least the first threshold TH1 by applying individually the predefined symbol recognition rules RL1 on these symbols. These symbols "∈" and "ℝ" thus constitute first symbols SB1 with the meaning of the present invention. These symbols "∈" and "ℝ" are well-known math symbols which are most of times used in a mathematical sense, thus having a relatively high confidence score to be a math symbol candidate.

FIG. 8 depicts other examples of pure math symbols that may be classified as first symbols SB1 during the first classification S12.

Symbols considered as pure text symbols may comprise for instance currency symbols (like "$", "€", etc.), bullets, space (between words), text punctuations like quotes " ", semi-columns ";", etc. which are usually not used in math.

In a variant, during the first classification S12 (FIG. 3), each symbol SB identified in S4 is classified as either a text symbol candidate or a math symbol candidate with a respective confidence score by applying individually the predefined symbol recognition rules RL1. In other words, a temporary text/math classification with a temporary confidence score may be attributed to each symbol SB including ambiguous mix text/math symbols, and may be later updated during the forthcoming classification process S10. The ambiguous mix text/math symbols will thus be assigned a weaker text/math classification confidence score at this stage compared with the pure text and pure math symbols. Accordingly, the first result RS1 produced by the first classification S12 may comprise, in addition to at least one first symbol SB1 identified as either a text symbol candidate or a math symbol candidate with a respective confidence score reaching at least the first threshold TH1, a temporary text/math classification with a respective confidence score for each other symbol SB.

In this variant, each symbol SB identified in S4 is thus attributed, based on the predefined symbol recognition rules RL1, embedding information IF2 comprising a respective confidence score that said symbol is either text or math.

An iterative process S14 (FIG. 3) is then performed as part of the classification process S10, based on the result RS1 of the first classification, to determine an appropriate classification as either text symbol or math symbol for each of the identified symbols SB with an associated confidence score. The initial text/math classification or labelling obtained in S12 is now used to extend (or improve) the text/math classification within the handwriting IN based on syntactic and semantic analyses.

More specifically, the second classification S16 and third classification S18 are based on analyses which take into account the context of each symbol SB of interest but in different manners. Accordingly, the symbol context information IF1*b* computed in S6 are used as input in the second and third classifications S16, S18.

This iterative process S14 comprises the second classification S16 and the third classification S18 that may each be performed only once or repeated a suitable number of times as described further below.

As shown in FIG. 3, the result RS1, comprising at least the initial text/math classification of each first symbol SB1 identified in S12 and their respective confidence score, is fed to the syntax processing module MD6 to perform the second classification S16.

In the second classification S16, the computing device DV1 classifies, among the identified symbols SB, at least one second symbol—noted SB2—other than said at least one first symbol SB1 as either a text symbol candidate or a math symbol candidate with a respective confidence score by applying, on said at least one first symbol SB1 and at least one second symbol SB2, predefined spatial syntactic rules RL2 defining spatial relationships between said at least one first symbol SB1 and said at least one second symbol SB2.

In substance, the computing device DV1 searches (S16), based on the predefined spatial syntactic rules RL2, for symbols SB2 which have predetermined spatial relationships with one or more of the first symbols SB1 identified in S12 as a result of syntactic connections they are sharing together. Based on this syntax analysis, one or more so-called second symbols SB2, other than said first symbols SB1, can be classified as either a text symbol candidate or a math symbol candidate.

The spatial syntactic rules RL2 define spatial relationships between math and/or text symbols and at least one other symbol in accordance with syntactic connections. More specifically, each spatial syntactic rule RL2 may define spatial relationships between a predefined math or text symbol and at least one other symbol, as described in examples further below.

During the second classification S16, the spatial syntactic rules RL2 are thus applied on each first symbol SB1 to identify as either a math symbol candidate or a text symbol candidate at least one other second symbol SB2 having a predefined spatial relationships with one or more first symbols. More particularly, the spatial syntactic rules RL2 may be applied on all symbols SB, taking into account the temporary confidence score allocated to the first symbols SB1 in the first classification S12 and updating them if necessary.

The spatial syntactic rules RL2 may be applied to a single first symbol SB1 or on a group of first symbols SB1 depending on the type of rule at hand. Groups of spatially related symbols can thus be collectively identified and classified.

This second classification S16 thus allows extending or consolidating the partial (or at least initial) text/math classification obtained in S12 by focusing primarily on the first symbols SB1 identified with a relatively good degree of confidence to identify and classify other symbols SB2 with which they share syntactic connections. Text/math labelling of more ambiguous symbols (other than pure text symbols and math symbols) can thus be achieved in an efficient and reliable manner.

The spatial syntactic rules RL2 may comprise at least one of:
- math spatial syntactic rules RL2*a* defining spatial relationships between at least two math symbols; and
- text spatial syntactic rules RL2*b* defining spatial relationships between at least two text symbols.

In the present case, it is assumed that the spatial syntactic rules RL2 comprise math spatial syntactic rules and text spatial syntactic rules.

Various spatial relationships in the case of math symbols may be considered. The spatial syntactic rules RL2 may for instance define spatial relationships between base symbols and subscripts (e.g. at the bottom right of the base symbol), between base symbols and superscripts (e.g. at the top right of the base symbol), fractions having numerator/denominator parts above and below a fraction bar, brackets occurring in pairs to denote sets, etc.

In a particular example, the math spatial syntactic rules RL2*a* define spatial relationships as follows:

fractions comprising a fraction bar separating a numerator component and a denominator component;

superscripts and subscripts associated with one or more symbols positioned respectively to the left-top or left-bottom of one or more base symbols;

overscripts and underscripts associated with one or more symbols positioned respectively over and under one or more base symbols; and matrices associated with a plurality of rows and columns of symbols arranged in a tabular form (the matrices may be with or without braces to group the symbols, depending on each case).

More math spatial syntactic rules RL2$a$ like presubscripts, presuperscripts, surrounding rules like the square root symbol, etc. can be considered, by borrowing them for instance from Latex math scripting, to enrich even further the syntax processing module (syntax expert) MD6 and accommodate more spatial relations between symbols.

In the case of text, the spatial syntactic rules RL2 may for instance define spatial relationships between text symbols based on punctuations, bullets, references, etc. but other examples are possible.

To perform the second classification S16, the syntax processing module (syntax expert) MD6 identifies each first symbol SB1 classified as math by the symbol processing module MD4 in S12 and labels also as math at least one other neighbour (or spatially-related) symbol SB2 as math if these symbols satisfy a math spatial syntactic rule RL2$a$. Likewise, the syntax processing module (syntax expert) MD6 identifies each first symbol SB1 classified as text by the symbol processing module MD4 in S12 and labels also as text at least one other neighbour (or at least spatially-related) symbol SB2 as text if these symbols satisfy a text spatial syntactic rule RL2$b$.

In other words, the second classification S16 comprises at least one of:

applying the math spatial syntactic rules RL2$a$ to identify, as a respective math symbol candidate, at least one other second symbol SB2 having a predefined spatial relationships with at least one first symbol SB1 identified as a math symbol candidate in the first classification S12; and applying the text spatial syntactic rules RL2$b$ to identify, as a respective math symbol candidate, at least one other second symbol SB2 having a predefined spatial relationship with at least one first symbol SB1 identified as a math symbol candidate in the first classification.

In the second classification S16, the syntax processing module (syntax expert) MD6 may in fact examine all the symbols SB, identify each set of two or more symbols which satisfy one of the predefined (math or text) spatial syntactic rules RL2 and label these symbols accordingly.

As shown in FIG. 9 in the present example, during the first classification S12, spatial syntactic rule RL2 are applied to the first symbols "∈" and "ℝ" previously classified as math symbol candidates in the first classification S12. As specified in the spatial syntactic rules RL1, there are usually math symbols before and after the symbol "∈" ("belong(s) to") and there is usually a math superscript associated to the symbol "ℝ" ("set of real numbers"). The computing device DV1 thus classifies in S16 the closing parenthesis ")" preceding the symbol "∈" and the superscript "2" at the top right of the symbol "ℝ" as math symbol candidates. In particular, the symbol "2" appears as a superscript to a math symbol. Hence it is labelled as math by the virtue of the superscript rule RL1. By applying a predefined spatial syntactic rule RL2 on this closing parenthesis ")", the opening parenthesis "(" spatially-related before the closing parenthesis ")" is also classified in S16 as a match symbol candidate. Since a closing parenthesis ")" can normally not "(" stand alone, the applicable syntactic rule RL2 defines an opening parenthesis "(" as spatially related to a closing parenthesis ")".

Likewise, by applying another spatial syntactic rule RL2, the computing device DV1 classifies in S16 the numerator, denominator and fraction bar of each fraction within these parentheses as math symbol candidates. A respective confidence score is computed and allocated to each second symbol SB2 classified in S16.

FIG. 10 shows, as another illustrative example, a case where the syntax processing module MD6 identifies spatially-related symbols with a syntactic connection, namely math superscript of a math base symbol. It can consistently tag as math all symbols along with its superscripts although these symbols are not necessarily math symbol if examined individually (not pure math symbols).

As depicted in FIG. 3, the second classification S12 thus produces a second result RS2 comprising an extended text/math labelling (classification) of the first and second symbols SB1, SB2, with their respective confidence score by applying the predefined spatial syntactic rules RL2. In this second result RS2, the text/math classification and associated confidence score of each first symbol SB1 obtained in S12 are retained. A text/math labelling and confidence score may thus be allocated to each second symbol SB2 identified in S16.

In a particular example, each symbol SB, other than the one or more first symbols SB1 classified in S12, is treated as a second symbol SB2 and is thus classified as either a text symbol candidate or a math symbol candidate and allocated a respective confidence score based on the spatial syntactic rules RL2. In other examples, one or more symbols may remain unclassified at this stage and classified later during the forthcoming third classification S18 or during another iteration (if any) of the iterative process S14. In other words, the second classification S16 may be an extended—but still partial—text/math labelling or may be a temporary complete text/math labelling of the handwriting IN.

For each second symbol SB2 (if any) which was already allocated a temporary text/math labelling and confidence score in the first classification S12, it can be updated or confirmed during the second classification S16.

The syntax processing module MD6 then feeds the second result RS2 to the semantic processing module MD8 to perform the third classification S18.

During the third classification S18 (FIG. 3), the syntax processing module MD8 updates or confirms the received result RS2 of the second classification S16 by establishing semantic connections (or semantic relationships, or semantic associations) between at least two symbols SB from the symbols SB identified in S4 and then compare these semantic connections with the result RS2 of the second classification S16.

In substance, the syntax processing module MD8 applies the predefined semantic rules RL3 to perform a deeper analysis of all the symbols SB based on semantically meaningful connections (or semantically meaningful relationships) between symbols to find math and/or text content. In other words, during the third classification S18, the computing device DV1 analyses the symbols at a semantic level, based on the meaning of the symbols SB, to establish semantic relationships between symbols SB. These semantic connections can be used to produce a more human-level, realistic and intelligent math vs text discrimination. The identified semantic connections (or semantic relationships) may extend over a line, a paragraph or even the complete handwriting content IN depending on each case.

A semantic connection (or semantic relationship) may define a relationship at a semantic level between two (or more) symbols SB, which may be consecutive or non-adjacent symbols in any particular types of order (spatial, temporal or any complex ordering). Semantic connections may be established at the levels of symbols, words, phrases, sentences or larger document units. For instance, two given symbols SB may be considered as semantically connected based on their actual meaning in the document if they have a same origin or conceptual root according to a given language. For example, in FIG. 12A (which is further discussed below), the first isolated "n" (symbol SB3) is the same symbol as the "n" in the last mathematical expression at the end of the phrase, hence these symbols "n" are semantically connected or related by the concept of same identity.

The semantic connections may be identified by carrying out long range dependencies in a handwritten line or passage. The dependencies are marked on the similarity, adjacency, complementary, etc. properties of all pertinent features previously computed in S6 as ink-related information IF1.

This third classification S18 thus allows discovering semantically related math or text symbols, possibly via relatively long range relations (long range dependencies in the handwritten line, paragraph . . . ). An accurate analysis of phrase structure can thus be achieved.

The predefined semantic rules RL3 may be applied to all symbols SB identified in S4 or to a sub-part thereof, taking into account the temporary confidence score allocated to the symbols SB in the second classification S16.

In the example shown in FIG. 11, the syntax processing module MD8 identifies the word "let" which leads to classifying a subsequent group of at least one symbol SB3 as math symbol candidate. In the present case, the symbols "p" following a first word "let" and the terms "L(c)" following a second word "let" are classified as math based on the applicable semantic rule RL3.

The FIG. 12A shows another example where the semantic processing module MD8 is able to recognise the symbol "n" as a math symbol while labelling the symbol "n" from the word "naturel" as text, even though these symbols "n" look very similar in appearance individually.

In other another example depicted in FIG. 12B, the semantic processing module MD8 is able to recognise that "E" is a variable defined in a math block and hence is able to label all its instances in the handwriting IN as math. As shown in FIG. 12C, even when modifying further the strokes SK to add a new symbol "E", the semantic processing module MD8 may still recognise this new symbol as math and avoid confusion with the modified "E" in the expressions "est" and "ensemble", thereby confirming that semantic relations have been used to improve the labels of genuine math symbols only.

The FIG. 13 shows still another example where the semantic processing module MD8 captures that the symbol "y" is a math symbol in the handwritten line based on semantic relations.

The semantic analysis in S18 allows extending even further the text/math labelling in the case where it is not already complete at this stage. Additionally, the labelling can be updated and thus improved for symbols which were already labelled as math or as text in the received second result RS2. The confidence score allocated to each classified symbol is updated to represent the degree of confidence in the obtained classification. A symbol SB previously labelled as text in the second result RS2 may for instance be re-classified as math with an updated confidence score, based on semantic connections detected between symbols SB.

The text/math classification of symbols and the associated confidence score are produced by the semantic processing module MD8 as a third result RS3 (FIG. 3).

In some cases, the semantic processing module MD8 may determine based on the predefined semantic rules RL3, that the second result RS2 obtained in the second classification S16 is correct. In other case, the second result RS2 may be updated by modifying the text/math label of at least one symbol SB, and/or by updating at least one confidence score associated to a classified symbol.

If the result RS2 of the second classification S16 is confirmed during the third classification S18 based on semantic connections, the result RS3 produced in the third classification S18 is identical to the result RS2 of the second classification S16. Based on the confirmed result RS3 (also called final result RS3), the computing device 100 thus recognises (S20) each symbol SB as either text symbol or math symbol.

The final result RS3 may thus be fed (S20) to the post-processing module MD12 to perform an optional recognition post-processing step S24 as described herebelow (FIG. 3).

If, however, the result RS2 of the second classification S16 is updated during the third classification S18 based on semantic connections, the result RS3 produced in the third classification S18 comprises a modified classification of the symbols as text and symbol candidates relative to the second classification RS2 along with respective updated confidence scores.

In a particular example, at least one symbol candidate is changed to/from text to/from math, and the respective confidence score is adapted accordingly in S18.

In the present example, the iterative process S14 is repeated at least once (or a plurality of times) if the second result RS2 has been updated during the third classification S18. In other words, upon detecting (S20, FIG. 3) that the second result RS2 is updated in the third classification S18 (or at least that a symbol has been reclassified from text to math or vice versa), the method proceeds (S20) with carrying out once again the second classification S16 based on the result RS3 of the third classification S18, to either confirm or update the result RS3.

If the syntax processing module MD6 confirms the result RS3, then the final result RS3 discriminating between math and text symbols SB is thus obtained and may be latter fed (S20) to the post-processing module MD12 to perform the optional post-processing step S24 (described herebelow). However, relabelling of some symbols SB by the semantic processing module MD8 may cause the syntactic processing module MD6 to relabel other symbols. Accordingly, if the result RS3 is updated by the syntax processing module MD6 based on a new syntactic analysis, a new second result RS2 is fed to the semantic processing module MD8 for performing once again the third classification S18 based on this updated result RS2.

The iterative process S14 may be repeated a plurality of times, until the second and third classifications S16, S18 converge to a same result, namely until either the result RS2 of the second classification S16 is confirmed in the third classification S18 or the result RS3 of the third classification S18 is confirmed in the second classification S12.

Each second and third classification S16, S18 is performed as described earlier. These back-and-forth interactions between the syntactic and semantic processing modules S6, S8 enable to converge together towards an accurate and reliable classification result RS3.

Once the processing modules MD6 and MD8 agree on a classification result, the final result RS3 of the third classification S18 is obtained thereby allowing the computing device 100 to recognise each symbol SB as either text symbol or math symbol. As indicated earlier, this final result RS3 may latter be fed to the post-processing module MD12 to perform the optional post-processing step S24.

In a particular example, if a predefined number N of iterations of the classifying process S14 is reached before the second and third classifications S16, S18 converge to a same result, the latest updated result RS3 obtained in the third classification S18 constitutes the final result RS3 and may be transmitted (S20) to the post-processing module MD12 to proceed with the post-processing step S24 (N being an integer of at least 2). It has been observed that the semantic analysis should be given priority over the syntactic analysis to produce the most accurate results.

Based on the final recognition result RS3 obtained in S20, the computing device DV1 may then execute a post-processing step S24.

Processing during the post-processing step S24 may be of various natures. In the present example, the post-processing step S24 comprises steps S26, S28 and S30 described further below.

More specifically, during the grouping step S26 depicted in FIG. 14, the computing device DV1 groups, based on the final result RS3 obtained in S20, all the strokes SK into blocks 30 of one or more strokes SK, each block 30 being either a math block 30a or a text block 30b. Each stroke SK contained in a text block 30b is a part of a text symbol SB and each stroke SK contained in a math block 30a is part of a math symbol SB.

The computed device DV1 may thus determine based on all symbols SB, a string of blocks 30 labelling each stroke SK as part of either a text symbol or a math symbol.

Each stroke SK contained in a block 30 belongs to the same category (text or math), which is the category allocated to the entire block 30. In particular, each sequence of successive strokes SK which are allocated the same type between math and text may be grouped (S26) into a same block 30.

In a particular example, each text block 30b are single baselined while each math block can be either single or multiple baselined.

This grouping step S26 allows generating the strokes into coherent single labelled blocks, i.e. math and/or text blocks. Different strategies may be implemented to aggregate classification results for each stroke.

The blocks 30 may be determined based on the classification of each symbol SB as math or text as defined in the received result RS3 of the third classification RS3 and also based on the spatial proximity of the strokes SK relative to each other.

The generation S26 of blocks 30 may also be based on other predefined constraints such as stroke level constraints, spatial constraints, etc. to make it more comprehensible, robust and useful for subsequent recognition. In a particular example, these constraints may comprise any one (or all) of the following:

overlapping strokes SK are grouped into a single block 30;

the strokes SK are grouped into horizontally spaced math or text blocks 30;

a threshold is set for minimum and/or maximum strokes SK per block (to remove noise), etc.

During the displaying step S26 (FIG. 3), the computing device DV1 displays (using the display device 2 or any other suitable display) the strokes SK along with boxes 35 representative of the respective blocks 30 to which each stroke SK belongs. FIG. 15 shows an example where such boxes 35 highlighting math blocks 30a are displayed, thereby allowing a user to identify easily which parts of the handwriting IN have been recognised as text or math.

In a recognition step S30 (FIG. 3), the computing device DV1 recognises math content and text content in the strokes SK by applying a math language model to each math block 30a and by applying a text language model to each text block 30b. This handwriting recognition is performed based on the stroke grouping achieved in S26.

Now that the computing device DV1 has determined with a high degree of confidence which strokes SK (or symbols) are text or math, a more accurate handwriting recognition can be performed (30) by respective recognizers which may be specifically trained to identify different sets of symbols with appropriate language models and grammars. Proper formatting and better handwriting recognition overall can thus be achieved.

Other examples of implementation are however possible without performing at least one of the steps S26-S30 during post-processing S24. For instance, post-processing S24 may be performed without displaying boxes 35 in S28.

As indicated earlier, the modules MD2-MD12 (FIG. 2) may each be or comprise one or more neural networks. In the example described above with reference with FIG. 3, each module MD4, MD6 and MD8 is executed by at least one neural network, for instance a long short-term memory (LSTM) neural network. A more detailed description of how a LSTM neural network may be used to perform the method of the invention is now provided herebelow with reference to the FIGS. 16-18, according to a particular embodiment.

An LSTM neural network (also called LSTM network or just "LSTM") is a recurrent neural network which analyses a sequence of inputs one by one (in a predefined order) and generates an output for each input. The LSTMs, introduced by Hochreiter & Schmidhuber in 1997, are capable of learning long-term dependencies. LSTM is a recurrent neural network (RNN) architecture that remembers values over arbitrary intervals. A LSTM network comprises a chain of LSTM cells CL1 (as described later) each passing information to a successor in the chain.

LSTM is well-suited to classify, process and predict time series given time lags of unknown duration. The nature and operation of a LSTM is generally well-known to the skilled person. Some details are provided below with respect to FIGS. 16 and 17 for the ease of reference. The skilled person however understands how an LSTM works and is thus able, based on the present disclosure, to adapt the configuration of a LSTM network to perform the steps S2-S20, and possibly even steps S2-S30 as previously described with reference to FIG. 3.

Figure 16:
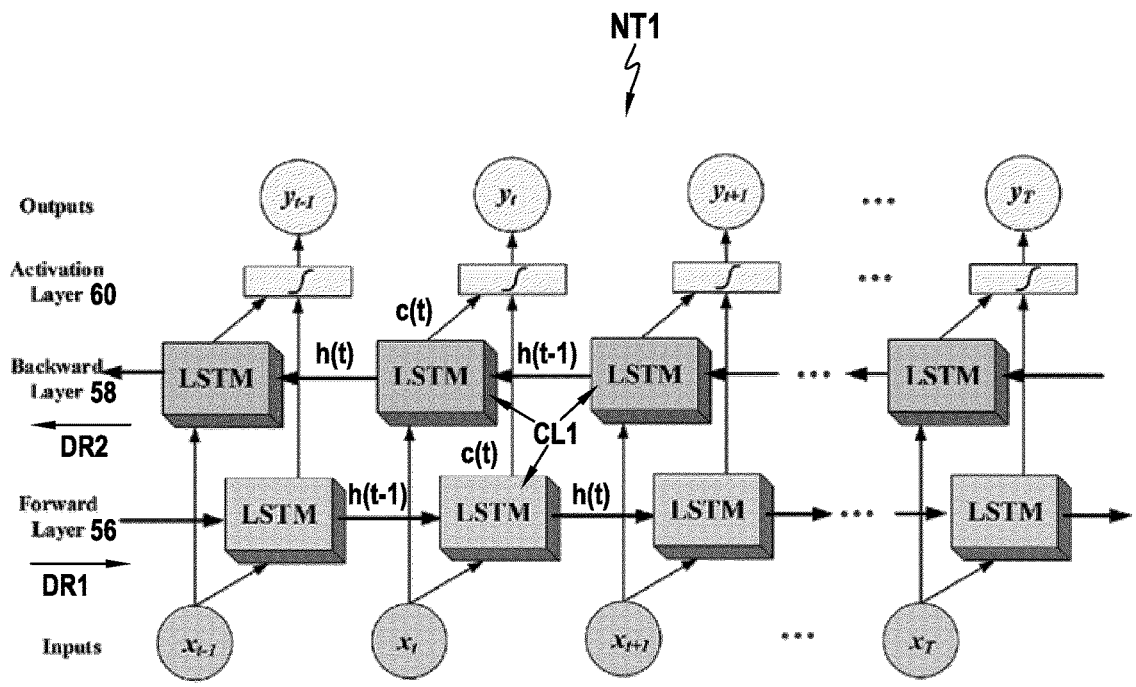
FIGS. 16 and 17 depict schematically the structure and operation of a recurrent neural network, according to a particular embodiment of the present invention.

More specifically, FIG. 16 represents schematically the global architecture of a bi-directional LSTM network—noted NT1—according to a particular embodiment. The bi-directional LSTM network NT1 comprises a forward layer 56, a backward layer 58 and an activation layer 60. The forward layer and backward layer 56, 58 are configured to analyse sequentially each symbol SB recognised in S4 (FIG. 3) according to two opposite directions, that is, in a forward direction DR1 and in a backward direction DR2. The forward and backward layers 56, 58 each comprises a plurality of LSTM cells (or LSTM modules) CL1 (FIGS. 16-17) configured to analyse the symbols SB of the handwritten input IN acquired in S2 (FIG. 3). Each LSTM cell CL1 acquires an input $x_t$ and a LSTM hidden state h(t−1) generated as a result of an analysis of a previous symbol SB in a given direction (DR1 or DR2). Based on these inputs $x_t$ and h(t−1), each LSTM cell CL1 generates a cell state C which is provided to the activation layer 60. The activation layer 60 combines the cell states C obtained for a given symbol SB in the two directions DR1 and DR2 to produce a final output $y_t$.

Figure 17:
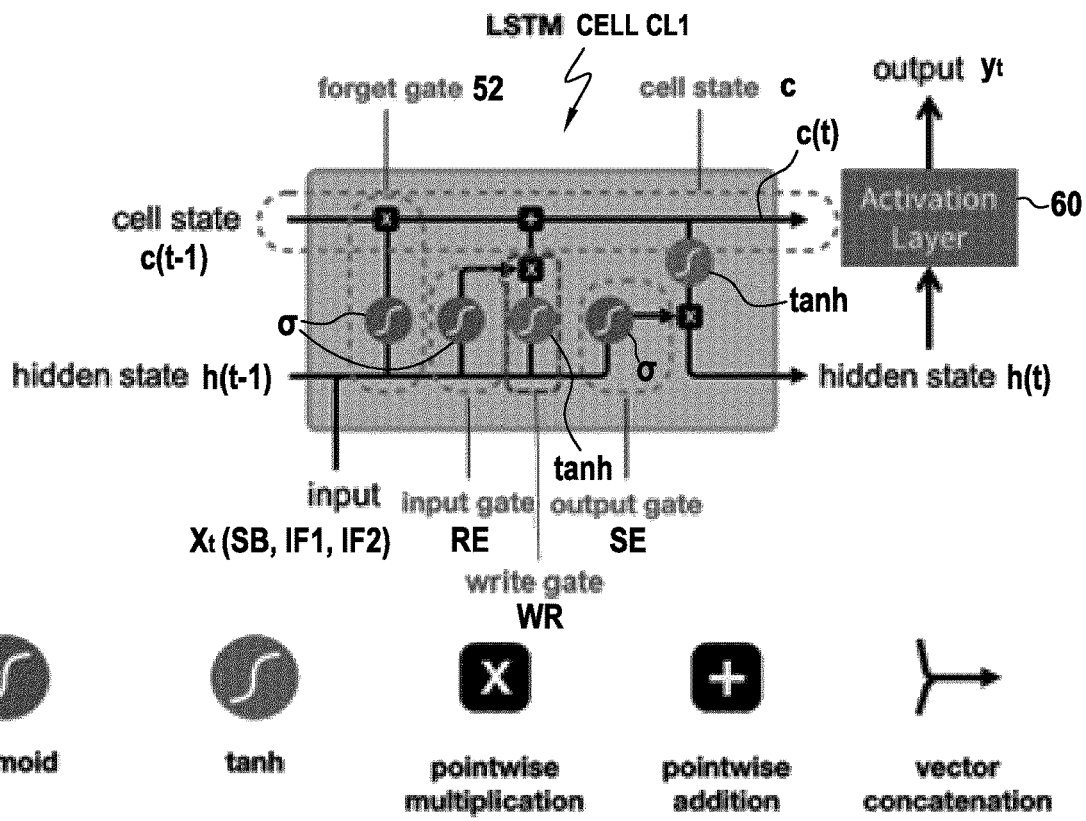

Further, FIG. 17 depicts schematically the global architecture of a LSTM cell CL1 according to a particular embodiment. Each LSTM cell CL1 uses a hidden state h(t−1) and a cell state C(t−1) relative to a previous symbol SB in the sequence to compute an output at the current time step based on an input $x_t$. The hidden state h(t−1) and a cell state C(t−1) both store relevant information from the past, i.e. from the processing of a previous symbol SB in the sequence. Each LSTM cell CL1 generates as outputs a current cell state C(t) which is transmitted to the activation layer 60 and a current hidden state h(t) which is provided to a next LSTM cell CL1 to process a next symbol SB in the sequence.

More specifically, as shown in FIG. 17, each line carries an entire vector, from the output of one node to the inputs of others. The LSTM cell CL1 comprises pointwise operations, like vector addition ("+"), and learned neural network layers (e.g. function tanh). Lines merging denote concatenation while a like forking means that its content is being copied and the copies going to different locations. A key aspect of the LSTM cell CL1 is the cell state h represented by the horizontal line running through the top of the LSTM cell. This cell state h runs through the entire chain of LSTM cells CL1, on which is applied repeatedly some linear interactions. Each LSTM cell CL1 has the ability to remove or add information to the cell state h received from the previous LSTM cell (i.e. the previous cell state h(t−1)), under the control of 3 gates. Each of these 3 gates comprises a sigmoid neural net layer ("σ") and a pointwise multiplication operation. Each sigmoid layer σ outputs numbers between zero and one, defining how much of each component should be let through. A value of zero means "let nothing through," while a value of one means "let everything through".

As shown in FIG. 17, the LSTM cell CL1 comprises an input gate RE, an output gate SE, a write gate WR and a forget gate 52. The hidden state h(t−1) and cell state C(t−1) received as inputs are updated during the current time step "t" into respectively h(t) and C(t), based on the current input $x_t$. The updated hidden states h(t) and cell state C(t) are then input to a next LSTM cell CL1 to perform the next time step computations of the next symbol SB, thereby taking into account the previous symbols SB in the symbol sequence.

The hidden state h is a working memory used for transmitting relevant information to a LSTM cell CL1 for processing the next symbol SB in the sequence. In general, the hidden state h suffers from vanishing and exploding gradients problem (for reference, see for instance https://en.wikipedia.org/wiki/Vanishing_gradient_problem), thus it is only able to store local syntactic and semantic information. In contrast, the cell state C is able to store and allow retrieval of long range or global syntactic and semantic information. The cell state C is a long-term memory used as input by the LSTM cell CL1. The cell state C is modified by the forget gate 52 (to remove information which are to be forgotten). The forget gate 52 implements a sigmoid function σ which defines which information should be forgotten from the previous cell state C (t−1) in the sequence of symbols SB. The input gate RE implements a sigmoid function σ which cooperates with a tanh layer (write gate WR) to generate new information to be added to the cell state C(t−1). The output gate SE implements a sigmoid function defining which information should be integrated into the next hidden state h(t).

The current cell state C(t) produced as an output by the LSTM cell CL1 is filtered by applying a sigmoid layer implemented by the output gate SE, and is then run through a tanh function (to set the values between −1 and 1) and multiplied by the output of the sigmoid output gate, to generate the current hidden state h(t) (FIG. 17).

An LSTM network can be bidirectional as shown in FIG. 16 by combining two LSTM architectures (i.e. two chains of LSTM cells) in both directions. A more detailed explanation of an LSTM architecture is present in the reference below: LSTM networks reference (tutorial): https://colah.github.io/posts/2015-08-Understanding-LSTMs/.

The expert modules MD4, MD6 and MD8 of the computing device DV1 (FIGS. 1-2) may all be implemented based on an LSTM architecture as described above notably in reference with FIGS. 16-17.

Figure 18:
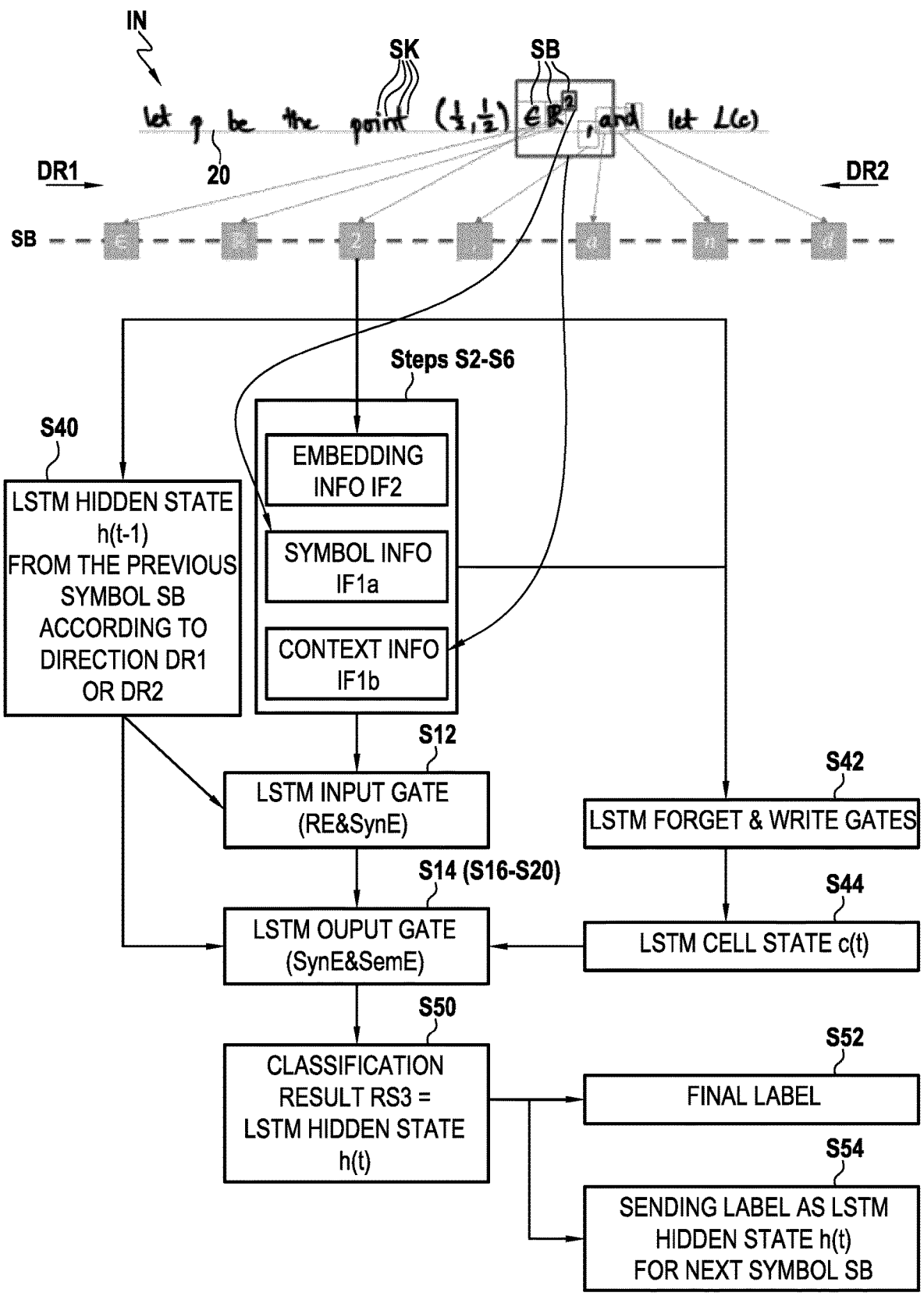
FIG. 18 is a block diagram representing schematically a method for processing math and text in handwriting according to a particular embodiment of the present invention.

FIG. 18 depicts as a schematic diagram the steps performed by the LSTM network to analyse a symbol SB of interest at a given time step, according to a particular embodiment. By way of an example, it is considered the case where the LSTM network analyses the symbol SB "2" as a current symbol while processing the symbol sequence one symbol at a time in the forward direction DR1. It should be understood that an analogous processing is performed by the LSTM for each symbol SB of the sequence, in both directions DR1 and DR2.

As shown in FIG. 18, it is first considered that the LSTM selects the symbol "2" as the current symbol SB to be processed and obtains (S6) as input the relevant information, i.e. the ink-related information IF1 associated with the current symbol "2" (symbol information IF1a and context information IF1b) and the embedding information IF2 associated with the current symbol "2".

As described earlier, the symbol positional (or spatial) features may be extracted (S6; FIG. 3) as part of the symbol information IF1a, based on each stroke SK forming the current symbol "2" (i.e. a single stroke SK in the present case). The symbol positional features may comprise information related to the position of the current symbol "2" with respect to the baseline 20 (e.g., height distance from baseline, distance from beginning of baseline . . . ). In the present example (FIGS. 5-6) the current symbol "2" in the expression "ℝ ²" is characterised and recognised as superscript because it is above a threshold distance from the baseline 20. Further, in the present example, the extracted context information IF1b characterise spatially-related strokes SK, i.e. strokes of the neighbourhood symbols "E", "ℝ", ",", and "a", as shown in FIG. 18. The embedding information IF2 may be obtained based on the predefined symbol recognition rules RL1 which allocate respective embedding information IF2 to each one of the set of predefined symbols PSB.

The information inputs IF1 and IF2 are fed (S12) to the input gate RE of a LSTM cell (or LSTM module) CL1 (FIG. 17) which acts as the symbol processing module MD4 (representation expert). The symbol processing module MD4 computes a vector of values comprising partial math/ text label information, as previously described with reference to the first classification step S12 (FIG. 3).

The input gate RE also receives and uses (S40, FIG. 18) the LSTM hidden state h(t−1) computed by the LSTM cell CL1 for the previous symbol SB according to the direction DR1, i.e. symbol "ℝ" which precedes the current symbol "2" in the present case. The input gate RE thus also acts as the syntax processing module MD6 (syntax expert).

The processing modules MD4 and MD6 are thus both invoked in steps S12 and S40.

The LSTM cell state C (FIGS. 17-18) of the LSTM cell CL1 captures and stores (S42), as the cell state C(t−1), all syntactic and semantic information from the symbols SB before or after (or both in case of bidirectional LSTM) the current symbol "2". These various inputs are also passed (S44) onto the forget gate 52 and updated into a current cell state C(t) (update gate) through the cell state line (FIG. 17).

The partial label information, output by the input gate RE in S12, is then passed (S14) onto the output gate SE (FIG. 17) which acts as the syntax processing module MD6 and semantic processing module MD8 (i.e. syntax and semantic expert modules; see FIG. 2). Based on the received partial label information, the processing modules MD6 and MD8 perform the second and third classification steps S16 and S18, as previously described, to generate final label information for the current symbol "2". The processing modules MD6 and MD8 uses the hidden state h(t−1) to perform the second and third classification steps S16 and S18.

The output of the output gate SE (i.e. the final label information) is used to update (S50) the previous hidden state h(t−1) into an updated hidden state h(t) for the current symbol "2". The updated hidden state h(t) is then forwarded to the activation layer 60 (FIG. 16) to generate (S52) the final label for the current symbol "2", as part of the classification result RS3 (see FIG. 3). In the present case where a bidirectional LSTM is used, two sets of final label information (from the output gate SE of two respective LSTM cells CL1) are produced, by processing the symbol sequence respectively in the backward direction DR2 and forward direction DR1. These two sets of final label information are evaluated and combined together to generate (S52) the final math/text label for the current symbol "2" (FIG. 16). This evaluation may be performed by concatenating the final label information from both LSTM cells CL1 and by passing them through the activation layer 60 to produce an array of probabilities; in the present case an array of length 2, one position for math and the other for text. The activation layer 60 may comprise multiplying the concatenated final label information (of final size 2 L) with a weight matrix of size 2 L×2, and then applying a softmax function (also known as softargmax or normalized exponential function) to ensure that the resultant output array of probabilities sum to 1.

A final label is produced in a same manner for each symbol SB of the sequence, by processing the symbol sequence in the two directions DR1, DR2 as described above.

In the present example, the LSTM architecture is configured with a fixed number of calls to the various processing modules (experts) MD4, MD6 and MD8. The LSTM network calls these processing modules in two stages, namely: in a first stage, the symbol processing module MD4 (representation expert) and the syntax processing module MD6 (syntax expert) are simultaneously called; and in a second stage, the syntax processing module MD6 (syntax expert) and the semantic processing module MD8 (semantic expert) are simultaneously called. Overall, the syntax processing module MD6 (syntax expert) is thus called twice (S12 and S14). The second call (S14) is to verify or propagate the results from the output of the semantic processing module MD6. As mentioned earlier, the bidirectional variant of LSTM takes care of context from previous and next symbols in the sequence to the current one.

Further, the skilled person may train the LSTM network in any suitable manner to implement the present invention. The LSTM network may learn detection of math in handwriting by updating the weights and biases of the various gates (i.e. for each sigmoid and tanh functions in FIG. 17) with the backpropagation algorithm (see the above-mentioned reference for more details). In particular, the weights and biases of the input gate RE and the embedding information IF2 are used to implement the symbol processing module MD4 (representation expert). The embedding information IF2 store prior knowledge about each predefined symbol PSB and the input gate RE learns how to process all of its inputs together (embedding information IF2, symbol information IF1a, contact information IF1b, hidden state). The weights and biases of the output gate SE, forget gate 52 and write gate WR are used together to implement the syntax processing module MD6 and semantic processing module MD8 (i.e. the syntactic and semantics expert modules), capable of utilizing and modifying the information stored in the cell state C(t−1) and hidden state h(t−1) to recover various syntax rules and semantic connections present in a given sequence.

The LSTM network may be trained with a dataset comprising a plurality of sequences of symbols containing both math and text, and sequences of symbols containing only text or only math. The training may be performed in multiple iterations while minimizing the overall symbol misclassification rate on the dataset, signifying that the network learns to 1) differentiate math from text symbols, 2) identify and apply math and text specific syntax rules, and 3) establish semantic connections between symbols in a given sequence.

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or blocks may be executed in an alternative order, depending upon the functionality involved.

While not explicitly described, the present embodiments may be employed in any combination or sub-combination thereof.

This disclosure having been described in particular embodiments, it is clear that it is susceptible to numerous modifications and embodiments within the ability of those skilled in the art and without the exercise of the inventive faculty. Accordingly, the scope of the invention is defined by the scope of the following claims.

The invention claimed is:

1. A method implemented by a computing device for processing math and text in handwriting, comprising:
   identifying symbols by performing handwriting recognition on a plurality of strokes of digital ink;
   classifying, as a first classification, at least one first symbol from the identified symbols as either a text symbol candidate or a math symbol candidate with a confidence score reaching at least a first threshold by applying individually predefined symbol recognition rules on the symbols;
   classifying, as a second classification, at least one second symbol other than said at least one first symbol as either a text symbol candidate or a math symbol candidate with a respective confidence score by applying, on said at least one first symbol and at least one second symbol, predefined spatial syntactic rules defining spatial relationships between said at least one first symbol and said at least one second symbol;

updating or confirming, as a third classification, a result of said second classification by establishing semantic connections between at least two symbols from the identified symbols and comparing said semantic connections with the result of said second classification; and recognising each symbol as either text symbol or math symbol based at least on a result of said third classification, wherein said method comprises computing, for each identified symbol, ink-related information based on each stroke forming said symbols, said ink-related information comprising:

symbol information characterising intrinsic properties of the one or more strokes forming said symbols; and context information characterising at least one neighbour stroke, spatially-related with the one or more strokes forming said symbol, in accordance with at least one respective ordering of the plurality of strokes;

wherein said ink-related information are used in at least said second and third classification to classify each symbol as either a math symbol candidate or a text symbol candidate.

2. The method of claim 1 comprising, prior to said identifying symbols, acquiring the plurality of strokes of digital ink forming the symbols, said identified symbols comprising at least one text symbol and at least one math symbol.

3. The method of claim 1, wherein during said identifying symbols, the plurality of strokes is compared with a set of predefined symbols and each symbol formed by the plurality of strokes is identified as a respective one within a set of predefined symbols.

4. The method of claim 1, wherein said first classification comprises:

determining, for each identified symbol, embedding information attributed by the symbol recognition rules to said symbol, said embedding information comprising a respective confidence score that said predefined symbol is either text or math; and comparing the respective confidence score of each identified symbol as defined in the embedding information with the first threshold to identify at least one first symbol as either a text symbol candidate or a math symbol candidate with a confidence score reaching at least said first threshold.

5. The method of claim 1, during said second classification, said spatial syntactic rules are applied on said at least one first symbol to identify as either a math symbol candidate or a text symbol candidate at least one other symbol having a predefined spatial relationships with one or more first symbols.

6. The method of claim 1, wherein during said second classification, each symbol other than said at least one first symbol is classified as either a text symbol candidate or a math symbol candidate.

7. The method of claim 1, wherein the spatial syntactic rules comprise:

math spatial syntactic rules defining spatial relationships between at least two math symbols; and text spatial syntactic rules defining spatial relationships between at least two text symbols.

8. The method of claim 1, wherein if the result of the second classification is updated during the third classification based on semantic connections, the result produced in the third classification comprises a modified classification of the symbols as text and symbol candidates relative to the second classification along with respective updated confidence scores, the method further comprising repeating the second classification on the result of the third classification to either confirm or update said result.

9. The method of claim 8, wherein an iterative classifying process comprising the second and third classifications is repeated until said second and third classifications converge to a same result.

10. The method of claim 8, wherein if a predefined number N of iterations of the classifying process is reached before the second and third classifications converge to a same result, the latest updated result of the second classification obtained in the third classification is used for recognising each symbol as either text symbol or math symbol, wherein N is an integer of at least 2.

11. The method of claim 1, wherein said recognising each symbol as either text symbol or math symbol comprises allocating to each stroke, based at least on the result of said third classification, a classification as either math or text along with an associated confidence score.

12. The method of claim 1, comprising grouping, based on a result of said recognising, the plurality of strokes into blocks of one or more strokes, each block being either a text block or a math block, wherein each stroke contained in a text block is a part of a text symbol and each stroke contained in a math block is part of a math symbol.

13. The method of claim 12, comprising recognising math content and text content in said strokes by applying a math language model to each math block and by applying a text language model to each text block.

14. A computing device for processing math and text in handwriting, comprising:

a first recognition module for identifying symbols by performing handwriting recognition on a plurality of strokes of digital ink;

a symbol processing module for classifying, as a first classification, at least one first symbol from the identified symbols as either a text symbol candidate or a math symbol candidate with a confidence score reaching at least a first threshold by applying individually predefined symbol recognition rules on the symbols;

a syntax processing module for classifying, as a second classification, at least one second symbol other than said at least one first symbol as either a text symbol candidate or a math symbol candidate with a respective confidence score by applying, on said at least one first symbol and said at last one second symbol, predefined spatial syntactic rules defining spatial relationships between said at least one first symbol and said at least one second symbol; and a semantic processing module for updating or confirming, as a third classification, a result of said second classification by establishing semantic connections between at least two symbols from the identified symbols and comparing said semantic connections with the result of said second classification;

said computing device being configured to recognise each symbol as either text symbol or math symbol based at least on a result of said third classification, wherein said computing device is configured to compute, for each identified symbol, ink-related information based on each stroke forming said symbols, said ink-related information comprising:

symbol information characterising intrinsic properties of the one or more strokes forming said symbol; and context information characterising at least one neighbour stroke, spatially-related with the one or more strokes forming said symbol, in accordance with at least one respective ordering of the plurality of strokes;

wherein said ink-related information are used in at least said second and third classification to classify each symbol as either a math symbol candidate or a text symbol candidate.

* * * * *